US011348018B2

(12) United States Patent
Rao et al.

(10) Patent No.: US 11,348,018 B2
(45) Date of Patent: May 31, 2022

(54) COMPUTER SYSTEM AND METHOD FOR BUILDING AND DEPLOYING MODELS PREDICTING PLANT ASSET FAILURE

(71) Applicant: Aspen Technology, Inc., Bedford, MA (US)

(72) Inventors: Ashok Rao, Sugar Land, TX (US); Hong Zhao, Sugar Land, TX (US); Pedro Alejandro Castillo Castillo, Houston, TX (US); Mark-John Bruwer, Richmond, TX (US); Mir Khan, Houston, TX (US); Alexander B. Bates, San Diego, CA (US)

(73) Assignee: Aspen Technology, Inc., Bedford, MA (US)

( * ) Notice: Subject to any disclaimer, the term of this patent is extended or adjusted under 35 U.S.C. 154(b) by 834 days.

(21) Appl. No.: 16/223,763

(22) Filed: Dec. 18, 2018

(65) Prior Publication Data
US 2019/0188584 A1 Jun. 20, 2019

Related U.S. Application Data

(60) Provisional application No. 62/607,809, filed on Dec. 19, 2017.

(51) Int. Cl.
G06N 5/04 (2006.01)
G06N 20/00 (2019.01)
(Continued)

(52) U.S. Cl.
CPC ............. G06N 5/04 (2013.01); G06F 16/215 (2019.01); G06F 16/2462 (2019.01); G06N 20/00 (2019.01)

(58) Field of Classification Search
CPC ........ G06N 5/04; G06N 20/00; G06N 3/0472; G06N 3/08; G06F 16/215; G06F 16/2462; (Continued)

(56) References Cited

U.S. PATENT DOCUMENTS 7,349,746 B2 * 3/2008 Emigholz .......... G05B 23/0208
702/182
9,141,911 B2 9/2015 Zhao et al.
(Continued)

OTHER PUBLICATIONS

Rakthanmanon et al., "Searching and Mining Trillions of Time Series Subsequences under Dynamic Time Warping," the 18th ACM SIGKDD Conference on Knowledge discovery and Data Mining, Aug. 12-16, 2012.

Primary Examiner — Tung S Lau
(74) Attorney, Agent, or Firm — Hamilton, Brook, Smith & Reynolds, P.C.

(57) ABSTRACT

A system that provides an improved approach for detecting and predicting failures in a plant or equipment process. The approach may facilitate failure-model building and deployment from historical plant data of a formidable number of measurements. The system implements methods that generate a dataset containing recorded measurements for variables of the process. The methods reduce the dataset by cleansing bad quality data segments and measurements for uninformative process variables from the dataset. The methods then enrich the dataset by applying nonlinear transforms, engineering calculations and statistical measurements. The methods identify highly correlated input by performing a cross-correlation analysis on the cleansed and enriched dataset, and reduce the dataset by removing less-contributing input using a two-step feature selection procedure. The methods use the reduced dataset to build and train a failure model, which is deployed online to detect and predict failures in real-time plant operations.

24 Claims, 18 Drawing Sheets

(51) Int. Cl.
*G06F 16/215* (2019.01)
*G06F 16/2458* (2019.01)

(58) Field of Classification Search
CPC ............ G05B 19/4184; G05B 23/0221; G05B 23/024; G06Q 10/00
See application file for complete search history.

(56) References Cited

U.S. PATENT DOCUMENTS

| | | | |
|---|---|---|---|
| 9,535,808 B2 | 1/2017 | Bates et al. | |
| 10,514,977 B2* | 12/2019 | Jones | G06F 11/0793 |
| 10,795,347 B2* | 10/2020 | SayyarRodsari | G05B 19/41885 |
| 11,029,359 B2* | 6/2021 | Honda | G06F 30/30 |
| 11,080,127 B1* | 8/2021 | Vincent | G06F 11/079 |
| 2002/0010563 A1* | 1/2002 | Ratteree | G06Q 10/06 703/2 |
| 2006/0058898 A1* | 3/2006 | Emigholz | G05B 23/0243 700/47 |
| 2016/0062820 A1* | 3/2016 | Jones | G06F 11/079 714/37 |
| 2020/0103858 A1* | 4/2020 | SayyarRodsari | G05B 19/4183 |
| 2020/0233740 A1* | 7/2020 | Jones | G06F 11/0793 |
| 2020/0320131 A1* | 10/2020 | Terrazas-Moreno | G06F 16/9035 |
| 2020/0387818 A1* | 12/2020 | Chan | G06Q 10/06 |

* cited by examiner

COMPUTER SYSTEM AND METHOD FOR BUILDING AND DEPLOYING MODELS PREDICTING PLANT ASSET FAILURE

RELATED APPLICATION(S)

This application claims the benefit of U.S. Provisional Application No. 62/607,809, filed on Dec. 19, 2017. The entire teachings of the above application(s) are incorporated herein by reference.

BACKGROUND

In the manufacturing industry, railway transportation, or any other machinery-intensive industry, sustaining and maintaining asset performance has become an important component in asset optimization of industrial plants or companies. However, due to extreme margin pressures, many asset failures and other undesirable events still occur in processes at industrial plants or in machinery equipment, which cost industries billions of dollars per year. These asset failures and other undesirable events include: unexpected unit operation breakdowns, plant shutdowns or equipment failures, and such. Typical undesirable events, for example, include locomotive operation breakdowns, compressor failures, distillation column flooding, emission violation, foaming and hydrate formation in columns, metals and mining issues, and the like. Because of the many undesirable events, providing for failure detection and prediction of these events in plant processes and operational machinery equipment is desirable and beneficial to industries. Such failure detection and prediction can assist plant/machine personnel in continually maintaining and optimizing the performance of their assets by improving safety, managing risk, reducing downtime, enhancing productivity, and increasing profitability.

However, such failure detection and prediction is complicated by the overwhelming amount of real-time and non-real-time data available for a plant or machinery equipment process. For example, at a plant, real-time and non-real-time measurements are collected in a plant historian database for a formidable number of process variables of a plant process. Performing process failure detection and prediction of undesirable plant events using the formidable amount of collected measurements presents a challenge to process engineers and operators.

Machine learning and deep-learning neural network (DLNN) techniques are advancing rapidly for mining data for use in applications (e.g., Thanawin Rakthanmanon et. al. "Searching and Mining Trillions of Time Series Subsequences under Dynamic Time Warping," the 18th ACM SIGKDD Conference on Knowledge discovery and Data Mining, Aug. 12-16, 2012, which is incorporated herein by reference in its entirety). Applications using deep-learning neural network models for automated failure detection in a plant or machinery equipment also showed promise, such as described in U.S. Pat. No. 9,535,808 B2, which is incorporated herein by reference in its entirety. There is a growing demand for applying machine learning in an intelligence solution that can use collected measurements to broadly detect and predict failures in a plant or machinery equipment process. However, there are several difficulties in using collected process measurements in a machine learning model for such broad failure detection and prediction.

First, as the root-cause of a process failure may involve multiple process variables that are unknown to the user (e.g., process engineer or equipment operator), an analysis of the root-cause must begin with the formidable number of process variable measurements from the process. For example, a plant operational historian typically includes measurements for hundreds of process variable tags collected over years for a plant process, which the root-case analysis must consider as model input variable candidates. Using all these process variable tags as possible candidates to build or train a deep-learning neural network model for indicating process failures is not only extremely time-consuming, but also challenging to modeling technology. For example, providing the large number of these process variable tags to a model as input is difficult, and the probability of successfully building and training the model using such a large amount of model input is reduced as the number of process variables increase.

Second, for successful model development in failure detection and prediction, current practices rely heavily on the user's experiences. Based on experience, the user is responsible for the choice of inputs and appropriate transforms, as well as many tuning parameters necessary for the model development, such as time intervals to predict events, data sampling frequency for analytics, and the like. Such a model development (building) process may not be suitable for non-expert users, and can be a challenge even to broad industrial users. Third, the process variable measurements from the plant operational historian data are usually not clean. That is, the process variable measurements typically include invalid ("bad") data segments or values, such as missing data (gaps), outliers, frozen sensor signals, unknown process disturbances, noisy values, and the like. Fourth, previous approaches are focused on classifying normal versus abnormal process variable measurements. As such, these approaches are more appropriate for fault detection, and not necessarily capable of accurately providing an early-warning prediction of a specific failure event.

Further, the existing state of the arts in deep-learning neural network (DLNN) techniques is mainly focused on model training algorithms. As such, less attention is paid to the selections of engineering features among the process variable inputs to the DLNN model based on process domain knowledge. The approach often used in the existing state of the arts is to feed all available process variable inputs into the DLNN model and let the training algorithms learn from the measurements of the process variable inputs (i.e., as a typical block-box modeling approach). For process engineers or equipment operators, however, the process variable inputs selected for the model need to make good physical senses, and the model predictions from the input-output relationship need to meet their expectations in most cases.

Based on understanding of the underlying process, or a domain knowledge, engineering features derived from a combination of process variable measurements may provide much more effective inputs to the model, and, also, make better physical sense to the process engineer or equipment operation. For example, a flooding factor of a column can be derived from many real-time process variable measurements and is a more efficient indicator as input for predicting column flooding. For another example, estimated compression efficiency of a compressor derived from many process variable measurements can be a better precursor of a failure event than using any individual process variable measurements for detecting and predicting compressor failures. The current approaches of the arts seldom provide such consideration of the process variable measurements in an automatic way. Therefore, these current approaches lack features for quickly and efficiently developing and deploying a model for both process/equipment failure detection and prediction from the formidable number of process variable measurements of a plant/equipment process.

SUMMARY

Embodiments of the present invention address issues in previous failure modeling approaches for plant and equipment process analytics. The embodiments build and deploy online scalable process failure models (e.g., machine learning models, statistical models, and such) for detecting and preventing plant and equipment failures in a subject plant or equipment process. The embodiments use an automated approach for data cleansing, feature engineering of process variable inputs, enriched input variable generation, and optimal selection of inputs for the failure models. This automated approach generates an improved, small-in-size sub-dataset of combined preselected historical operational measurements and derived engineering feature values for the subject plant or equipment process. The improved sub-dataset is used in building and training the process failure models. The methods of the embodiments facilitate the process failure model building and training significantly. To generate the improved sub-dataset, the embodiments begin by loading available measured inputs (measurements) for measurable process variables of the subject plant or equipment process from a plant historian or asset database. The loaded available measured inputs comprise an original (raw) input dataset.

The embodiments then provide a unique approach by first performing feature engineering using the available measured inputs of the dataset to derive feature variables and corresponding values (feature inputs). Through the feature engineering, the embodiments generate an enriched input dataset from the original input dataset. To do so, the embodiments apply an automated data enrichment procedure to derive the feature inputs from the measured inputs in the raw input dataset, which are added to the original input dataset. The embodiments also provide input-output model fitting analytics to test and drop from the enriched input dataset measured inputs and/or derived feature inputs that show no or relatively less correlations with a selected failure event. As a result, the embodiments provide results with a significant input dimension reduction on the original input dataset through multiple techniques.

In this approach, the embodiments may first cleanse bad quality (invalid) data segments and measurements for non-informative measurable process variables from the original raw input dataset. For example, these embodiments may apply the automated data screening and slicing technique described in U.S. Pat. No. 9,141,911 B2, which is incorporated herein by reference in its entirety.

The embodiments then enrich the input space (the original raw dataset) using feature engineering, which generates values for one or more derived feature variables possibly more predictable to a target failure events than values for measured input variables. The embodiments derive the feature variables and corresponding values (inputs) either based on physical principles or numerical transforms, for example, by applying a logarithm transform to values of a measurable input variable (measured input) of the dataset, or calculating a new input variable using a math equation on one or more measured input of the dataset. The derived feature inputs are then added to the dataset and together with the measured inputs form an enriched dataset. The embodiments next perform cross-correlation analysis among all inputs of the enriched dataset, including both the measured and derived feature inputs. The cross-correlation analysis identifies highly correlated inputs of the dataset and groups them to limit these highly-correlated (redundant) inputs from all being selected as final inputs to the failure model.

The embodiments then apply a two-stage feature selection technique to the enriched dataset that includes building multiple models which compare a defined objective with minimum prediction errors against a defined event indicator. To do so, the embodiments apply a preliminary feature selection technique, followed by a secondary feature selection technique, to the enriched dataset for selecting an input sub-dataset from the enriched dataset. In the preliminary and secondary feature selections, each input (either measured input or derived input) of the enriched dataset is treated as a "feature" input to fit a failure (event) prediction model. In an iterative modeling process, those feature inputs showing less contributions statistically to the output predictions of the model are dropped, and only a small subset of inputs ("features") remain for building a final failure model.

Alternatively, some embodiments may further reduce the size of the input sub-dataset by applying a multivariate statistical model, such as a Projection-to-Latent-Structure (PLS) model. The applied multivariate statistical model projects the remaining inputs of the cleansed/enriched input sub-dataset into a lower dimension latent structure space that maximizes the covariance with a defined failure indicator. If there are still more than one highly correlated inputs in the sub-dataset, optionally, the multivariate statistical model automatically selects a small subset of the projected variables (called a "latent variable") that contributes most to the process failures in the input sub-dataset. The statistical model selects the small subset without losing important measurement information from the inputs.

The embodiments use the resulting small and enriched input sub-dataset for building and training a deep-learning neural network model with improved predictable capability to detect and predict plant/equipment process failures. For example, the embodiments may use the enriched sub-dataset containing values of: (i) measurable process variables and derived feature variables, or (ii) selected latent variables as inputs to build and train a deep-learning neural network model as described in U.S. Pat. No. 9,535,808 B2, which is incorporated herein by reference in its entirety, as a failure model for the subject plant/equipment process. The embodiments then deploy the failure model online to monitor for the plant process failures with real-time plant data collected by plant sensors. The online deployed failure model can then predict a failure early by the small and enriched inputs of the online deployed failure model indicating a failure sign or signature in the real-time plant operation.

Example embodiments are directed to computer systems, methods, and program products for building and deploying a model predicting failure in an industrial plant or equipment process. The computer systems comprise at least one processor and memory with computer code instructions stored thereon. The memory is operatively coupled to the processor such that, when executed by the processor, the computer code instructions cause the computer system to implement a data importer module, an input data preparation module, an input enrichment module, an optimal input feature selection module, a model training module, and a model execution module. The computer program products comprise a non-transitory computer-readable storage medium having code instructions stored thereon. The storage medium is operatively coupled to a digital processor, such that, when executed by the processor, the computer code instructions cause the processor to detect and predict a failure in an industrial process.

The computer methods, systems, and program products generate an initial dataset by loading a set of historical measurements of process variables of a subject industrial plant or equipment process. Each process variable comprises measurements related to at least one component of the subject industrial process. In some embodiments, the measurements of each process variable are loaded in a time-series format from at least one of: a plant historian, plant asset database, plant management system, formatted spreadsheet, formatted text file, and formatted binary file. The computer methods, systems, and program products may also define a failure indicator synchronized to measurements associated with one or more failures in the subject industrial process. In some embodiments, the defined failure indicator is a Boolean flag variable that synchronizes to historical measurements at least one of: historical plant failures across the subject industrial process, of a representative failure/event process variable of the subject industrial process, or of a specific time window of historical data before an event/failure (pre-failure-window) for the subject industrial process.

The computer methods, systems, and program products cleanse and repair the generated dataset. The computer methods, systems, and program products cleanse the generated dataset by identifying and removing measurements that are invalid (bad) in quality or non-informative for modeling the one or more failures. In some embodiments, the measurements that are invalid in quality include at least one of: missing values, frozen signals or flat-line values, outlier values, values out of a process normal operating range in high and low limits, and extremely high noisy values. In some embodiments, the computer methods, systems, and program products repair the invalid in quality measurements by at least one of: filling in missing values with interpolation, applying non-phase-shift filters to remove noisy values, replacing values with model produced values, down-sample input measurements values by snapshots or calculated averages with multiple re-sampling rates, and up-sampling values with interpolated values.

The computer methods, systems, and program products then enrich the cleansed/repaired input dataset with physically meaningful or numerically more relevant derived variables. To enrich the dataset, the computer methods, systems, and program products derive feature variables (and corresponding feature variable time-series values) from the cleansed/repaired input dataset, and add the derived feature variable time-series values to the dataset, creating an enriched dataset. The computer methods, systems, and program products may derive feature variable values by transforming the measurements of process variables in the dataset (e.g., computing logarithm of measurements, computing quadratic or polynomial values of a measurements, and such) or applying engineering equations of domain knowledge (e.g., computing a compression efficiency of a compressor, computing a flooding factor of a distillation column, computing internal refluxes flow, and such). The computer methods, systems, and program products may also derive feature variable time-series values by calculating one or more time-series statistical values from the process variable measurements (e.g., calculating a moving average value (MVA) over a time-window, estimating derivatives or rate of changes, standard deviation over time (STD), moving standard deviation (MVSTD), moving changing rate, and such).

The computer methods, systems, and program products then identify groups of highly correlated inputs in the cleansed/enriched dataset. Each identified group of highly correlated inputs includes one or more of: measurements of process variables and values of derived feature variables in the cleansed/enriched dataset. In some embodiments, the computer methods, systems, and program products calculate dynamic correlations from the measurements/derived values of the cleansed/enriched dataset as follows. In these embodiments, the computer methods, systems, and program products apply a dynamic cross-correlation analysis (function) over a specific time window to each pair of process variable historical measurements or derived feature variable values in the cleansed/enriched dataset. The dynamic cross-correlation function results in estimated cross-correlation coefficient values for each pair over the specific time window. The dynamic cross-correlation function further finds, over the time window, a maximum cross-correlation coefficient value for each pair by plotting/searching a trend curve between the pair using the respective cross-correlation coefficient values. The computer methods, systems, and program products then normalize the calculated maximum cross-coefficient value for each pair to a score (e.g., 0.0-1.0), and compares the normalized score of each pair to a defined correlation threshold (e.g., 0.9). If a normalized score meets or exceeds a pre-defined correlation threshold, the computer methods, systems, and program products group the inputs of the pair and places the grouped inputs into a ranked list of other similarly highly-correlated inputs. The computer methods, systems, and program products may perform feature selection using the ranked list of highly correlated input and the cleansed/enriched dataset.

The computer methods, systems, and program products performs feature variable selection (e.g., run a feature variable selection module). The computer methods, systems, and program products may perform a preliminary feature variable selection by building multiple step-wise linear or nonlinear regression models using the inputs of the cleansed/enriched dataset. The computer methods, systems, and program products compare each model's predictability using computed $R^2$ values to select one or more inputs as a member of a sub-dataset. After iterative step-wise regressions, a large number of inputs are excluded from the sub-dataset due to either showing high correlations to one or more already selected inputs (based on the groups of highly correlated inputs), or showing less contributions to a model having higher $R^2$ values. In some embodiments, the computer methods, systems, and program products select one representative input from each group of highly correlated inputs and those remaining less correlated (relatively independent of other variables in the cleansed/enriched dataset) inputs respectively, building step-wise linear regression models. The most predictable variables are selected. As a result, only a subset of the cleansed/enriched inputs is chosen to join an input sub-dataset used for final model building and deployment.

Using the reduced number of inputs in the input sub-dataset, the computer methods, systems, and program products may perform a secondary feature selection. To do so, the computer methods, systems, and program products further divide the input sub-dataset (configured in a time-series) over a historical horizon into multiple segments according to the normal operation periods, without including known process failure or events and anomaly periods where process failure or events are confirmed. In this way, some segments contain only normal operation data, some segments contain at least one failure (anomaly) data, and other segments may contain both normal and anomaly data. The computer methods, systems, and program products then build multiple multivariate statistical models using the inputs of the sub-dataset and randomly selected data segments. For each multivariate statistical model, the randomly selected data segments are used as training dataset, and the rest are used as a testing dataset. An overall statistic value of $R^2$ for a model over both training and testing data segments is calculated as a model fitting "goodness" measure. More than one statistical models are alternatively built by switching the training and testing data segments, and only the best performed model (with maximum $R^2$ values) is chosen. This modeling approach is known as cross-validation by which the resulted model has improved robustness and over-fitting problem is avoid.

Alternatively, some embodiments may further reduce the size of the input sub-dataset by applying a multivariate statistical model, such as a Projection-to-Latent-Structure (PLS) model. In some embodiments, the multivariate statistical model is one of a Projection-to-Latent-Structure (PLS) model or a multivariate regression model. The computer methods, systems, and program products build the multivariate statistical model to determine contribution of each input of the input sub-dataset to the one or more failures. The computer methods, systems, and program products may further reduce the final enriched dataset by removing one or more inputs based on their determined contributions by truncating a set of latent variables and removing those less predictable contributors. The computer methods, systems, and program products then build and train a failure model using the further reduced input sub-dataset. In examples embodiments, the failure model is a deep-learning neural network (DLNN) model, and in example embodiments the training of the failure model includes anomaly detection and failure signature training In some embodiments, the computer methods, systems, and program products examine the multivariate statistical model as follows to determine contributions of process variables in the sub-dataset. The computer methods, systems, and program products transform the inputs of the process variables in the sub-dataset into a projection latent structure by projecting the inputs onto a lower-dimensional subspace with PLS algorithm where the covariance between projected latent variables and the defined failure indicator is maximized. Based on the projection, the computer methods, systems, and program products determine contribution coefficients indicating statistical contribution of each input to the defined failure indicator in terms of magnitudes and directions. The computer methods, systems, and program products then provide the inputs in ranked order of the determined contribution coefficients. Based on the ranking, the computer methods, systems, and program products remove from the input sub-dataset inputs having contribution coefficients showing insignificant statistical contribution or with high uncertainty in statistical confidence.

Further, in other embodiments, the computer methods, systems, and program products may further retrieve the values of the latent variables generated from the PLS model. The computer methods, systems, and program products determine a subset of the latent variables' values most relevant to the one or more failures in the subject plant process by truncating the latent variables' values using a reduced-order and best fit model. In these example embodiments, the computer methods, systems, and program products build and train the failure model using the determined subset of latent variables' values, rather than the reduced dataset.

The computer methods, systems, and program products deploy the built and trained failure model to monitor the real-time operations of the subject industrial process. The deployed failure model may provide continuous key performance indicators (KPIs) used as an indicator of process failures over time. The deployed failure model may perform at least one of online anomaly detection, failure signature recognition, and failure prediction warming on the real-time operations of the subject industrial process or equipment operation. Based on the monitoring, the computer methods, systems, and program products detect and predict one or more failures in the real-time operations. In some embodiments, the computer methods, systems, and program products build and execute an associated PLS model in parallel with the DLNN failure model to monitor the real-time operation for changes in correlated structures based on Hoteling statistics $T^2$ and Q statistics Square Projection Error (SPE). Embodiments may thus be incorporated in, or otherwise coupled to, process controller(s) of a plant/industrial process.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
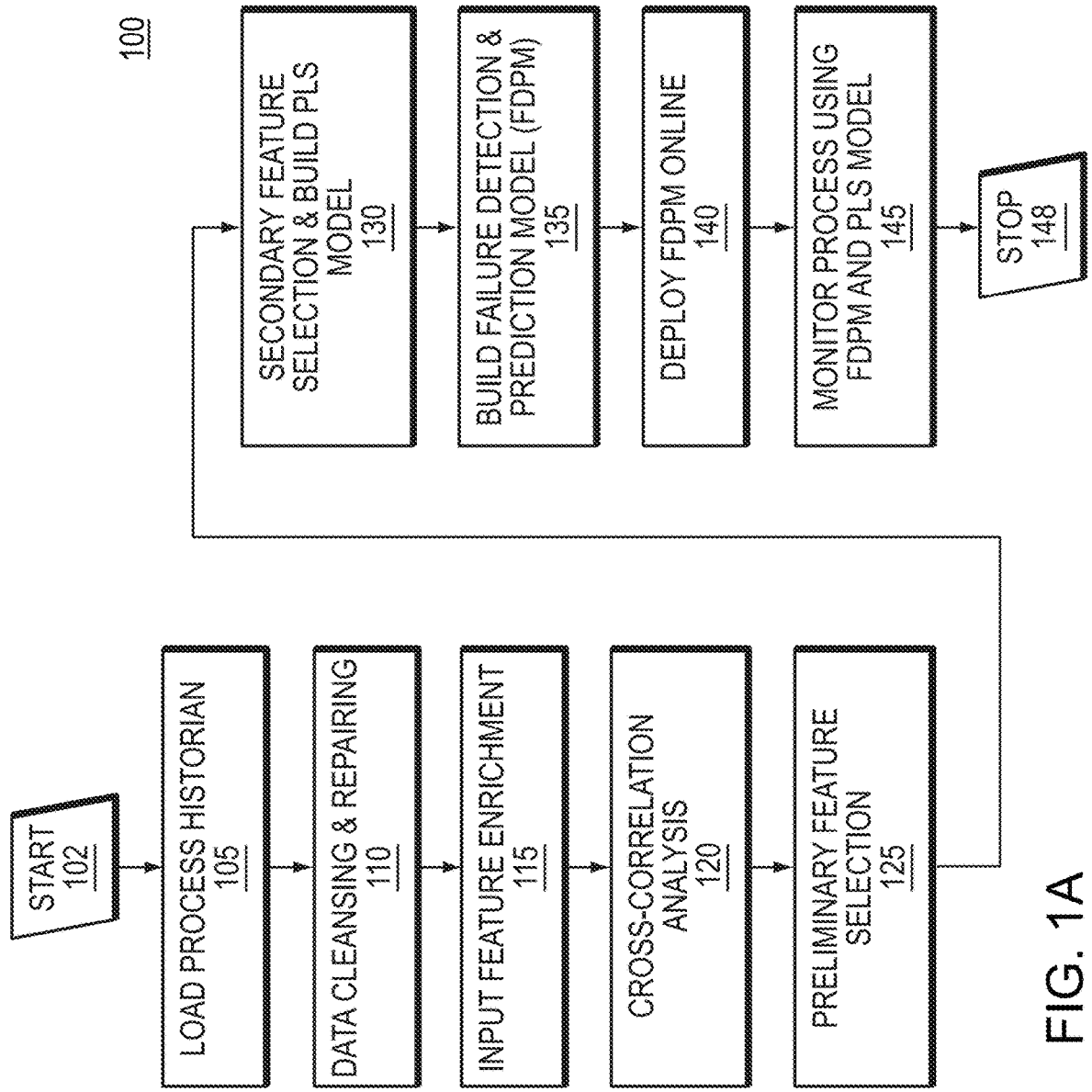
FIG. 1A illustrates a flowchart of an example method for building and deploying a failure detection and prediction model in embodiments of the present invention.

A description of example embodiments follows.

The teachings of all patents, published applications and references cited herein are incorporated by reference in their entirety.

Overview

To achieve asset optimization, online process monitoring for equipment or (and) process operational failure detection/prediction is an emerging technology in the process industry, such as at refineries and chemical or petrochemical plants. In this emerging technology, there is increasing interest in developing applications that successfully use machine learning and big data to detect and predict failures in industrial production processes. Previous applications in the process industry have only limitedly used machine learning to detect/predict equipment failures, such as in pumps, compressors, and other mechanical equipment. For example, successful machine learning applications offered predictive and prescriptive maintenance of equipment failures in locomotives, as disclosed in U.S. Pat. No. 9,535,808 B2, which is incorporated herein by reference in its entirety. Previous efforts have been made to expand the application of machine learning more broadly to plant processes. However, the approaches used in these previous efforts have encountered limitations and challenges that must be addressed to provide an effective machine learning solution for failure detection and prediction in plant processes.

In particular, previous efforts have been focused on particular machinery equipment failures. In modeling such equipment failures, the possible variable measurements related to the machinery equipment failures are relatively small in number, and, thus easy to select as inputs to a machine learning model. For example, these variable measurements may include measurements taken from temperature and pressure sensors around a specific piece of equipment (e.g., a compressor, pump, or other rotary machines), on lubricative oil content, vibration measurements, and such. In such cases, the maximum number of process variable candidates to serve as input measurements to the machine learning model for modeling an equipment failure is typically within the tens. However, in a plant process failure in the process industry, the process variable candidates that may contribute as inputs to the failure model are usually unknown, one has to start with a much larger number than for equipment failures. In a modern plant or refinery, the process is designed with highly integrated mass and energy flows and the process's safe operation will involve hundreds to thousands of sensor measurements. Thus, failure detection and predictive model development has to consider a much larger number of possible process variable measurements as possible model inputs.

Unlike in equipment failure cases, another challenge in training a machine learning model with process variable measurements of a plant process is that process variable measurements are often not clean. That is, there are often many invalid ("bad") data segments among the process variable measurements in the operational historian database, such as data segments including missing data (gaps), outliers, frozen sensor signals, process disturbances, noisy values, and such. Thus, data screening, cleansing, and repairing of the process variable measurements becomes critical to ensure modeling succeed using these measurements. Further, in the case of equipment failures, signatures in many machines often appear in an accumulative process before a failure and may be used to monitor for and detect the equipment failures. In plant processes, however, it is unknown whether a process failure can be detected with early accumulative signatures, and, thus it is unknown how soon a model can provide an accurate prediction of a process failure event.

In addition, other difficulties in building an effective predictive model in process failure cases is that the root-causes of a process failure can be far more complex than a machine failure case, and there may not necessarily be direct correlation relationships between the failure and input measurements. Therefore, previous techniques trying to find and identify measurable inputs (factors) to a failure (response) via simple correlation analysis or directly building a MLNN model with only limited measurable inputs may be ineffective. Based on process domain knowledge, it is known in many cases that a calculated process (derived) variable (e.g., transformed values of an original measurable process variable, a particular combination of several measurable process variables, statistical measures of one or more process variables, and such) can be more predictable to the process failures. Thus, a more desirable input space for building an effective failure prediction model should contain both values of original measurable input variables and derived (feature) variables.

Embodiments of the present invention provide an innovative approach to address the above obstacles and facilitate the development and deployment of a predictive process failure model. The embodiments generate a raw dataset containing measurements for process variables of a subject production process from a plant historian database. The embodiments address the obstacles of data quantity by identifying and repairing or cleansing "bad" quality data segments from the raw dataset and removing measurements for uninformative process variables from the dataset. A powerful data screening and preprocessing tool incorporated in these embodiments assist in addressing data quality problem in an automatic way. To identify more predictable inputs for building an effective failure model, the embodiments then expand the input space by enriching the input of the cleansed dataset through generation of derived (feature) variables. The embodiments then use methods to resolve the difficulties that a user may encounter in selecting model inputs from a formidable number of process variables.

To do so, the embodiments implement a systematic approach of selecting the most predictable and less cross-correlated inputs of the enriched dataset, so that the dimension reduction of inputs for failure model building and deploying are facilitated significantly. To minimize the input space size, while ensuring no important inputs will be missed, the embodiments use an iterative evaluation procedure on every candidate input of the enriched dataset by building "internal" candidate regression models and calculating the models' predictability scores. The embodiments then apply two iterations (preliminary and secondary) to repeat the evaluation for each candidate input. The preliminary selection is based on overall process data history and the secondary is based specifically on partitioning process data segments before process failures. After two rounds of evaluations, the inputs showing the highest scores are selected as final inputs for building and deploying a failure model that is most predictable in identifying process (or equipment) failures in a subject production process.

Alternatively, the embodiments may use a statistical PLS model that can handle measurements from hundreds of process variables as model inputs. The PLS model maps the reduced dimension input dataset of process variable measurements into an even lower dimension latent variable space, while maximizing covariance between latent variables and an indicator of the identified process failures. In this way, the PLS model automatically further reduces the redundancy of correlated input variables. As a result, the PLS model helps identify a set of important contributors to a plant or equipment process failure, and further downsizes the dataset by truncation. This further downsizing leads to the dataset including only measurements and derived values for a reasonably small subset of process variables (e.g., relevant sensors) without losing relevant information. The embodiments use either the low-dimension latent variables or the resulting reduced input to further facilitate the building and training of a process failure detection and prediction model that can classify and handle both accumulative and abrupt signatures. The build/trained process failure detection and prediction model addresses the problem of detecting a process failure based only on accumulative signatures.

Method of Building and Deploying Failure Models

FIG. 1A illustrates an example method 100 of building and deploying a scalable failure model for online prediction, detection, and prevention of one or more plant (or equipment) process failures in a subject plant (industrial, chemical, and the like) process. To build the failure model, the method 100 generates an improved dataset to be used as input to the failure model. The improved dataset may contain original recorded measurements of process variables, enriched feature variables (derived variables), or both for the subject plant process. To generate the improved dataset, the method 100 effectively enriches the measurements of the original process variables and then reduces the formidable number of measurements, as well as values of derived variables, for the subject plant process to a set of key inputs relevant to identified one or more plant process failures. The success of the failure model in predicting, detecting, and preventing an identified plant process failure is based on the effectiveness of method 100 to select for the dataset the small set of key measurements/derived values used as input to the failure model.

Load Process Data

The method 100 begins at step 102, which may include suitable or certain initialization (common in the art) of the failure model building process and the subject plant process data. The method 100, at step 105, loads historical and real-time operations data (measurements) for process variables of the subject plant process from a plant historian or asset database. In other embodiments, the method 100 (step 105) may load (import) operations data for the subject production process variables from other sources, such as other plant data servers, plant management systems, or any other resources of the plant. In yet other embodiments, the operations data may be loaded from a file format, including a spreadsheet file, a text file, a binary file, and such. The loaded operations data includes continuous measurements for a formidable number of process variables (process variable tags) for the subject production process, as typically measurements for hundreds or even thousands of process variables are stored in the plant historian or plant asset database over time for a production process. The method 100 (step 105) generates a raw dataset that contains the loaded original operation data (measurements) for the process variables of the subject process, formatted as a time-series based on timestamps associated with the operations data.

In some embodiments, the method 100, at step 105, may select a subset of the formidable number of process variables for the subject plant process as the candidate process variables contained in the dataset. In these embodiments, the method 100 (step 105) identifies at least one process failure of the subject plant process (or multiple process failures of the subject plant process). The method 100 (step 105) selects a subset of process variables potentially associated with the identified process failure as the candidate input variables contained in the dataset. The method (step 105) may then load from the plant historian database the operations measurements (with associated timestamps) for only the selected candidate process variables.

Figure 2A:
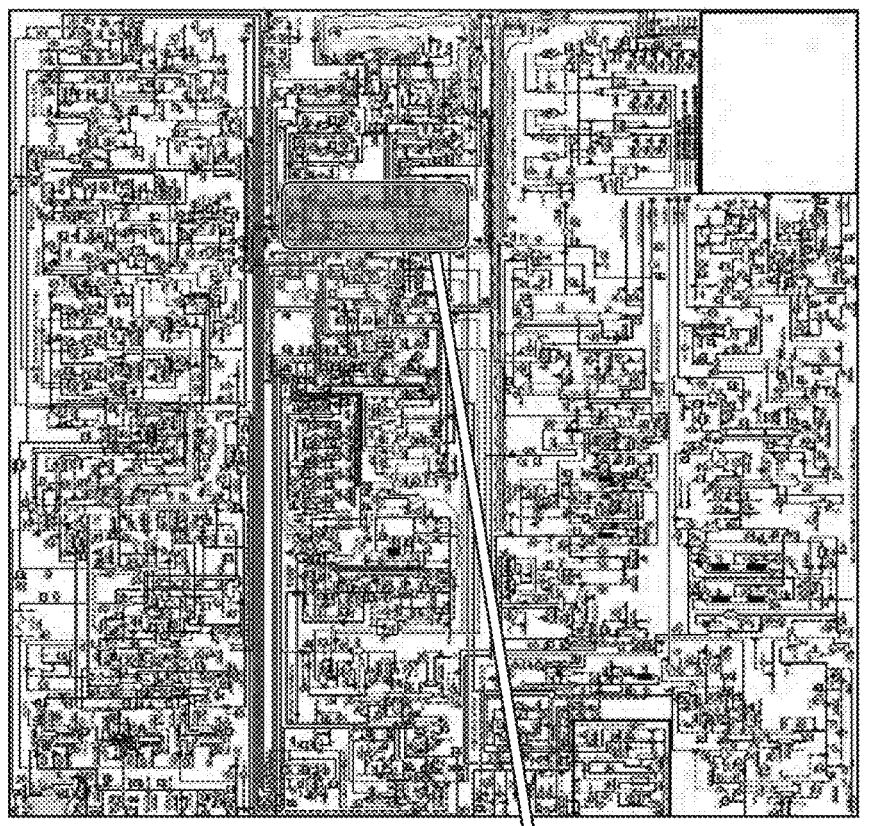
FIG. 2A illustrates a plant piping and instrumentation diagram/drawing (P&ID) used to select candidate process variables in embodiments of the present invention.
Figure 2A:
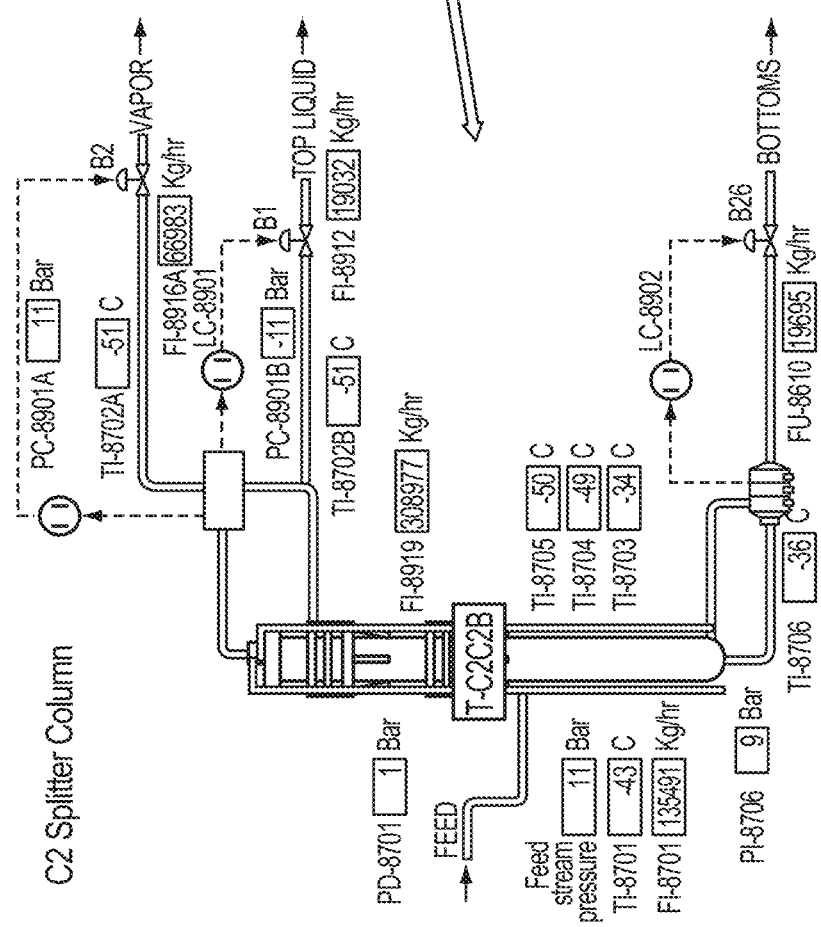

For example, the method 100 (step 105) may enable a user (e.g., plant operator, process engineer, and such) to identify a set of candidate process variables potentially associated with (relevant to) an identified process failure of the subject plant process. In some embodiments, the method 100 (step 105) may display to the user, through a user interface, a plant piping and instrumentation diagram/drawing (P&ID), as shown in FIG. 2A, for the subject plant process. The user, through the user interface, can view and select process variable tags (e.g., F1-8701 and TI-8701 of FIG. 2A) depicted in the P&ID to identify the candidate process variables potentially associated with the identified plant process failure. The method 100 (step 105) loads the continuous operation measurements (time-series with associated timestamps) for the selected candidate process variables.

For another example, the user, through the user interface, may enter the first few characters of a process unit name or tag group name (e.g., 02CUD*) potentially associated to the identified plant process failure. In response, the method 100 (step 105) searches and filters the process variable tags in the plant historian database to locate process variables tags matching the user-entered characters. The method 100 (step 105) selects the matching process variable tags as the candidate process variables for the subject process, and loads the continuous operation measurements (time-series with associated timestamps) for the selected candidate process variables from the plant historian database.

Figure 2B:
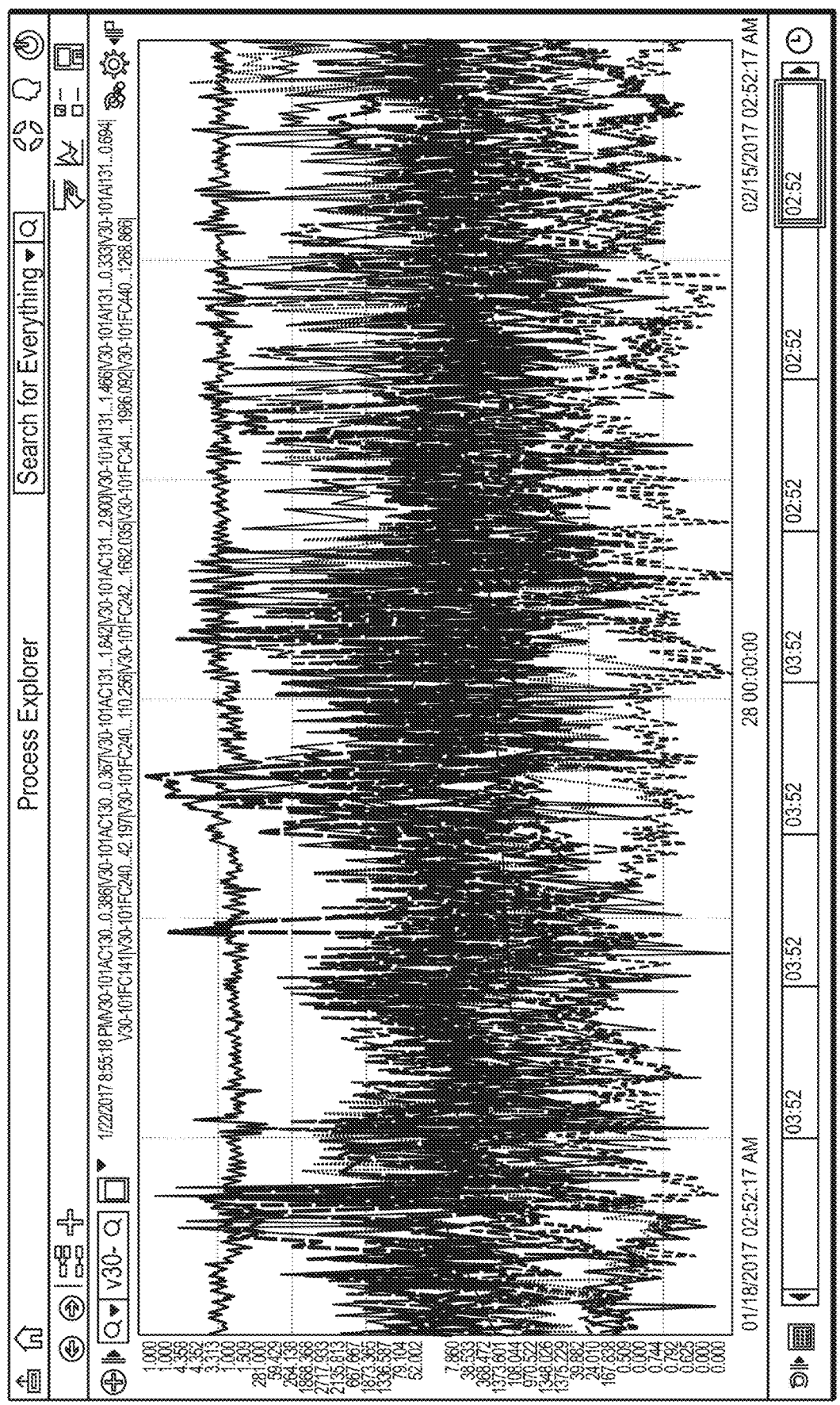
FIG. 2B illustrates an example data chart of an initial dataset of process variable candidates loaded from a plant historian in embodiments of the present invention.

The method 100, at step 105, generates a raw input dataset that contains the loaded operation measurements for the selected candidate process variables of the subject process, formatted as a time-series based on the associated timestamps. FIG. 2B is a time-series graph depicting an example dataset of operation measurements loaded from a plant historian database for the candidate process variables. FIG. 2B illustrates the continuous operation measurements for each of the formidable number of candidate process variables.

Repair and Cleanse Dataset

The method 100, at step 110, performs data cleansing and repairing on the raw input dataset generated in step 105. In example embodiments, the method 100 (step 110) applies an automated data screening and slicing technique for identifying and cleansing the generated dataset. In some embodiments, the method 100 (step 110) applies the automated data screening and slicing technique described in U.S. Pat. No. 9,141,911 B2, which is incorporated herein by reference in its entirety.

For each candidate process variable of the dataset, the method 100 (step 110) screens the process variable's continuous measurements, and identifies measurement data (partial and whole) that is of bad quality (invalid) for modeling and predicting the identified process failure associated with the subject plant process. The method 100 (step 110) automatically marks the identified measurement data for possible exclusion from the dataset. The identified bad quality measurement data for a candidate process variable includes, but are not limited to, missing values (gaps), frozen signals (constant values crossing over the whole history), short-term outliers, and values are out of process in high/low process limits or highly noisy in the continuous measurements of the candidate process variable. The method 100 (step 110) may identify and mark bad quality measurement data of a candidate process variable based on data sample status, recorded value quality, known sensor interruptions, process downtime, operational high and low limits, as well as calculating statistics on the continuous measurement data (as loaded from plant historian database in step 105). The calculated statistics for a candidate process variable includes, but is not limited to, mean, median, standard deviation (STD), histogram, skewness, and kurtosis.

The method 100 (step 110) provides flexibilities to pre-process the marked bad quality measurement values of the dataset with several repair and removal processing options to cleanse these values. In some embodiments, the method 100 (step 110) displays the marked bad quality measurement data to the user, via a user interface, and enables the user to select or confirm cleanse or repair options to apply to the marked measurement data.

In some embodiments, the method 100 (step 110) may repair some or all of the marked bad quality measurement data for the candidate process variables in the dataset. In cases of missing measurement values (gaps) for a candidate process variable, the method 100 (step 110) may fill-in the gaps in the continuous measurement data with interpolation. In cases of outliers, gaps, and other bad data segments in the measurement data for a candidate process variable, the method 100 (step 110) may apply model-based data repair to replace these bad data segments with internal model-produced measurement estimation values. The method 100 (step 110) may also repair relatively short slices of bad values, gaps, frozen signals, and the like for a candidate process variable by using principal component analysis (PCA) or subspace modeling and sensor validation algorithms, as described in U.S. Pat. No. 9,141,911 B2, which is incorporated herein by reference in its entirety.

In cases of noisy measurement values for a candidate process variable, method 100 (step 110) may improve data distribution by applying non-phase-shift filtering to data (de-trend, resample, up-sample, down-sample, and such) portions of the measurement data containing drifting or filter noisy values for synchronization. The method 100 (step 110) may resample or down-sample measurement values for the candidate process variable with values taken from snapshots or calculated time-center averages of the measurement values, or up-sample measurement values for the candidate process variable with interpolated values. The method 100 (step 110) may also prepare the measurement data with pre-processing options, such as by re-sample the measurement data for a candidate process variable at a-sample-per-minute to a-sample-per-hour using a "Centre-average" or "filter-smoothen" technique.

A "Centre-average" value can be calculated with the following formula:

$$\bar{y}(t) = \frac{1}{2n+1} \sum_{i=-n}^{n} y(t+i)$$

where 2n+1 is the width of a time window.

The "filter-smoothen" technique filters the original time series two times, one forward and the other backward with a smoothen filter, such as a first-order filter:

$$\bar{y}(t) = \alpha \times \bar{y}(t-1) + (1-\alpha) \times y(t-1)$$

where (0<α<1)

In some embodiments, the method 100, at step 110, may cleanse (remove or slice) bad quality (invalid) data measurements or a subset of candidate process variables from the dataset. In example embodiments, method 100 (step 110) may select and remove measurements of a set of candidate process variables in the dataset that are non-informative to the identified process failure of the subject process. For example, the measurements of the selected set may have long-time constant values (flat lines in a time-series plot), a large portion of missing values (gaps), and the like. In some embodiments, the method 100 (step 110) may compare the measurements of each candidate process variable to identify and eliminate from the dataset the candidate process variables having fewer good measurement values and less information related to the identified process failure.

In some embodiments, the method 100 (step 110) may eliminate portions of the whole dataset over a time window within which no identified process failure of the subject plant process appeared. For example, the method 100 (step 110) may remove (cutting-off) extra-long time periods or segments of measurement data that do not contain failure events (i.e., "non-event" normal operational data segments). For another example, the method 100 (step 110) may applying a dynamic floor and ceiling across the dataset for outlier detection and removal from the measurement data.

Figure 2C:
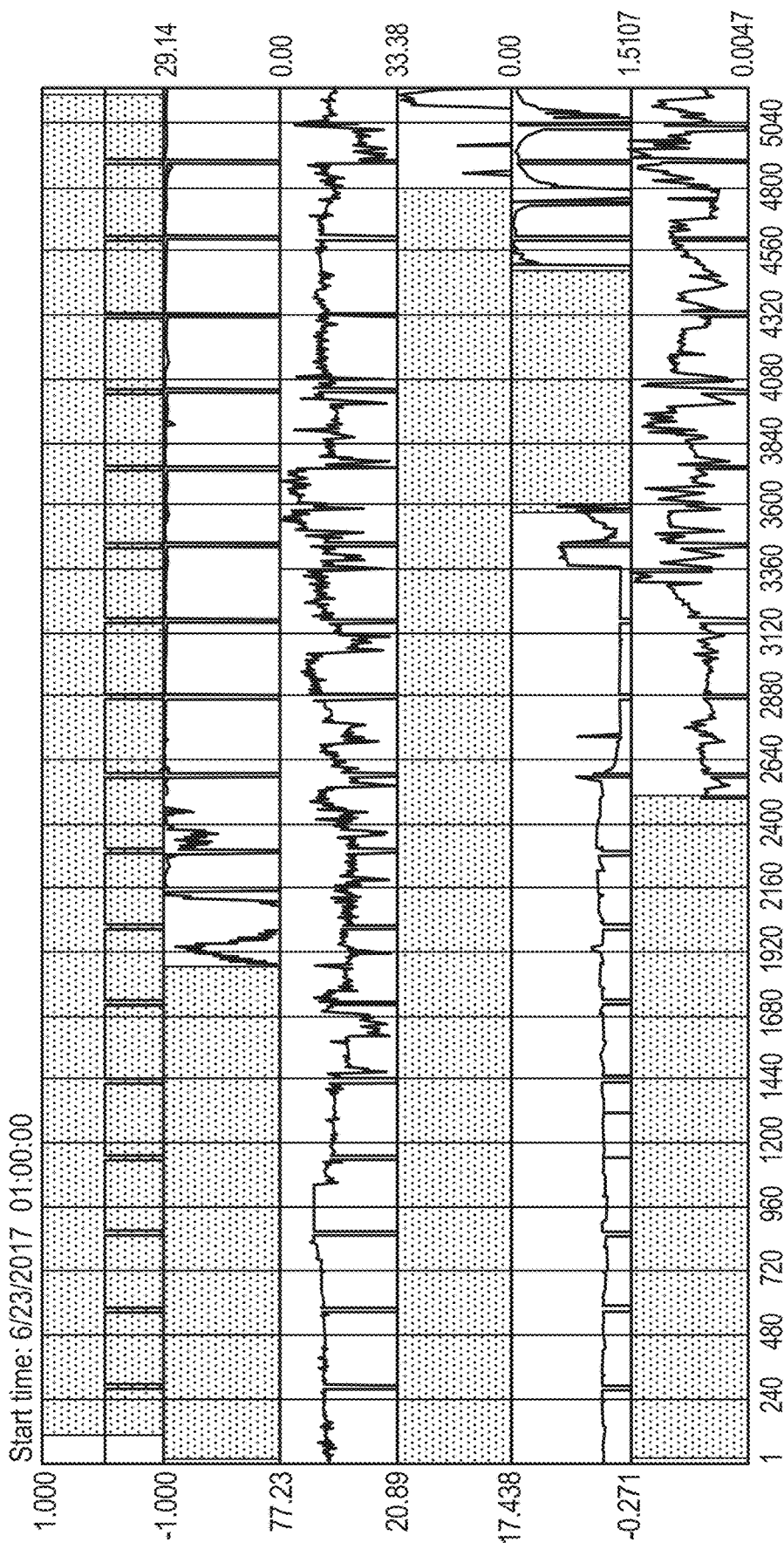
FIG. 2C illustrates a data chart of example bad data sections and non-informative measurements identified by a cleansing operation in embodiments of the present invention.

FIG. 2C illustrates an example of a time series of process variable measurements for a plant process contained in a generated raw input dataset. The X-axis is time, shown in number of samples, the Y-axis is sensor measurement values. The measurements indicated by dotting are samples identified and marked as example bad data sections and non-informative measurements identified by method 100 (step 110), which may be removed from the generated dataset.

Perform Input Feature Enrichment

The method 100, at step 115, then performs input feature enrichment on the cleansed/repaired input dataset resulting from step 110. The feature enrichment enhances the dataset by adding physically meaningful or numerically more relevant derived process variables and corresponding values The method 100 (step 115) automatically derives various feature variables and corresponding values from the measurements of candidate process variables in the dataset. The derived feature variable values may possibly be more predicative of the identified at least one process failure of the subject plant process than the measurements of candidate process variables in the dataset. The method 100 (step 115) may derive the feature variables and corresponding values using engineering transform equations. These equations may correspond to specific process or units (equipment) having measurements in the dataset. For example, step 115 may derive feature variables' values by transforming the measurements of candidate process variables in the input dataset (e.g., computing logarithm of measurements, computing quadratic or polynomial values of a measurements, and such). For another example, step 115 may derive feature variables' values based on computing engineering knowledge-based virtual values based on measurements of candidate process variables in the input dataset (e.g., computing a compression efficiency of a compressor, computing a flooding factor of a distillation column, computing internal refluxes flow, and such). For further example, step 115 may derive the feature variables' values by computing statistical measurements based on the measurements of candidate process variables in the input dataset (e.g., calculating a moving average value (MVA), estimating derivatives or rate of change, standard deviation over time (STD), moving standard deviation (MVSTD), moving changing rate, and such).

The method 100 (step 115) adds the derived features values to the dataset (from step 110) to generate an enriched dataset. The size of the input dataset is temporally increased by adding the enriched feature variables' values. However, the enrichment of the input space (input dataset) by adding the feature variables' values are proven helpful in building an improved failure model for predicting a process failure of the subject plant process.

Figure 1B:
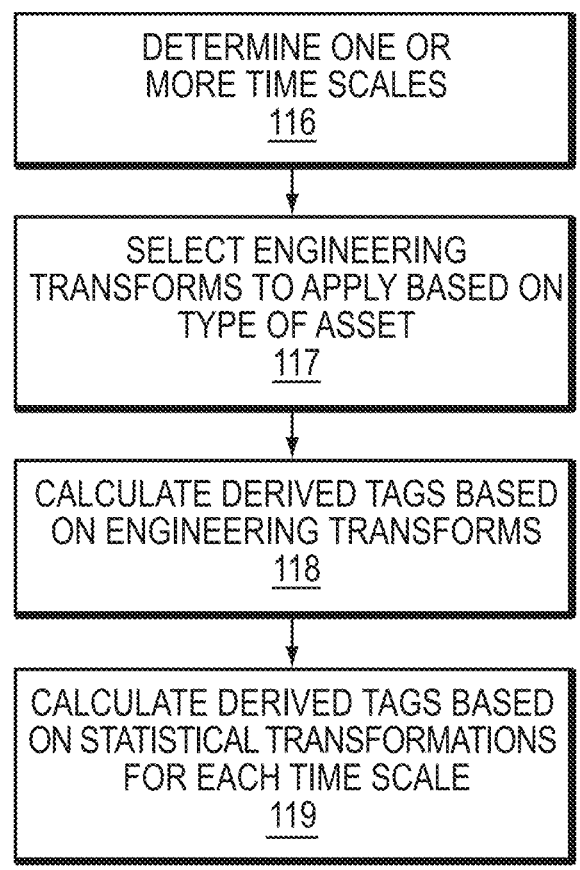
FIG. 1B illustrates a flowchart of an example method for input data enrichment in embodiments of the present invention.

To perform input feature enrichment, the method 100 (step 115) may use the example method 115 illustrated in FIG. 1B. The method 115, at step 116, first determines an appropriate time scale of measurements for candidate process variables (candidate process variable measurements) in the cleansed dataset. The time scale can be selected for achieving optimal modeling, and is mostly dependent on process type and domain knowledge. In example embodiments, therefore, the time scale may be defined according to a user-specified value or a system default value (e.g., in minutes, hours, days, weeks, months, or years). At step 117, the method 115 then requests a user to select engineering transform equations, or uses default engineering transform equations for a specific process unit, such as a distillation column, a furnace, a compressor, a pump, and the like. The method 115, at step 118, next automatically derives tag values or virtual input values for the specified process unit based on the selected/default engineering transform equations and the measurements of the specific process unit in the dataset. At step 119, the method 115 further derives statistical feature tag values for the specific process unit based on the selected/default statistical equations and the measurements. The derived tags or virtual inputs of step 118 and derived statistical feature tags of step 119 are referred to as enriched feature variables. The method 115 adds the values of the enriched feature variables to the input dataset to generate a feature enriched input dataset.

Perform Cross-Correlation Analysis on Enriched Dataset

The method 100, at step 120, performs data cross-correlation analysis on the cleansed/enriched input dataset resulting from step 115. The cross-correlation analysis facilitates identifying and grouping highly correlated inputs (including both measurements of process variables and values of derived feature variables) in the cleansed/enriched dataset.

To perform the cross-correlation analysis, the method 100 (step 120) analyzes each pair of inputs (measurements of process variables and values of derived feature variables) in the cleansed/enriched input dataset. As any pair of inputs in the input dataset may change with a possible time delay, the method 100 (step 120) specifies a time window (interval) having a width capable of covering the longest possible time delay between a pair of inputs in the input dataset. The method 100 (step 120) selects the time window to cover time delay and dynamic transactions in the behavior of the subject process between any pair of inputs. By selecting such a window, the method 100 (step 120) may capture and analyze on the inputs that may not be well synchronized natively.

The method 100 (step 120) then performs a dynamic cross-correlation analysis (function) over the specific time window. Different from the calculation of a conventional correlation coefficient between two variables, the dynamic cross-correlation function estimates a set of cross-correlation coefficients over the specified time window for each pair of inputs of the input dataset based on the entire length of time series data for the input measurements. The dynamic cross-correlation function estimation results in a short time series segment of estimated cross-correlation coefficient values for each pair of inputs over the time window. The method 100 (step 120) next determines a maximum cross-correlation coefficient value for each pair of inputs (in magnitude) by plotting/searching over a trend curve between the pair using the respective cross-correlation coefficient values. For each pair of inputs, step 120 may normalize the cross-correlation coefficient value of the pair to a score (e.g., a value between 0.0-1.0).

The method 100 (step 120) then compares the calculated maximum cross-correlation coefficient value or score of each pair over the correlation time window to a defined global correlation threshold value or thread (e.g., default value, thread=0.9, and the like). In different embodiments, a cross-correlation coefficient value does meet the defined global correlation threshold value, when the cross-correlation coefficient value is great than the threshold. Based on the comparison, the method 100 (step 120) determines whether a pair of inputs is highly correlated and, if so, the two inputs will create a new or join an existing highly-correlated input group. Within such a highly correlated input group, each joined inputs of a pair show high correlations to other joined inputs. For example, if the maximum correlation coefficient value for a first pair of inputs reached a value greater than the correlation threshold (e.g., r=0.9), step 120 may determine that pair is highly correlated and group the pair.

If later, a second input pair shows high correlation determined by comparison with the correlation threshold, and one of the second input pair has been grouped into an earlier created high correlation group, then the second input pair will join that earlier group. For instance, if input pair X1 and X3 are found to be highly correlated (e.g. coefficient >0.9), and input pair X3 and X7 are also found to be highly correlated, then, X1 and X7 are most likely also highly correlated according to principles of linear algebra. Therefore, all three inputs (X1, X3, X7) are put into a high correlation group and only one will later be selected during the feature selection step (step 125 to follow). According to linear system theory, highly correlated inputs contain redundant information for a linear prediction model and may cause ill-conditioning problems if all join the modeling as inputs. Therefore, step 120 ranks the highly correlated groups and places the ranked highly correlated groups into an input correlation list. In example embodiments, the method 100 (step 120) may apply an automated input group ranking algorithm to generate the ranked input correlation list of the highly correlated input groups. In this way, method 100 (step 120) identifies a ranked list of highly correlated inputs and later (step 125 to follow) allows only one representative input from each group to be selected for building a failure model that can predict one or more process failures in the subject process.

Figure 2D:
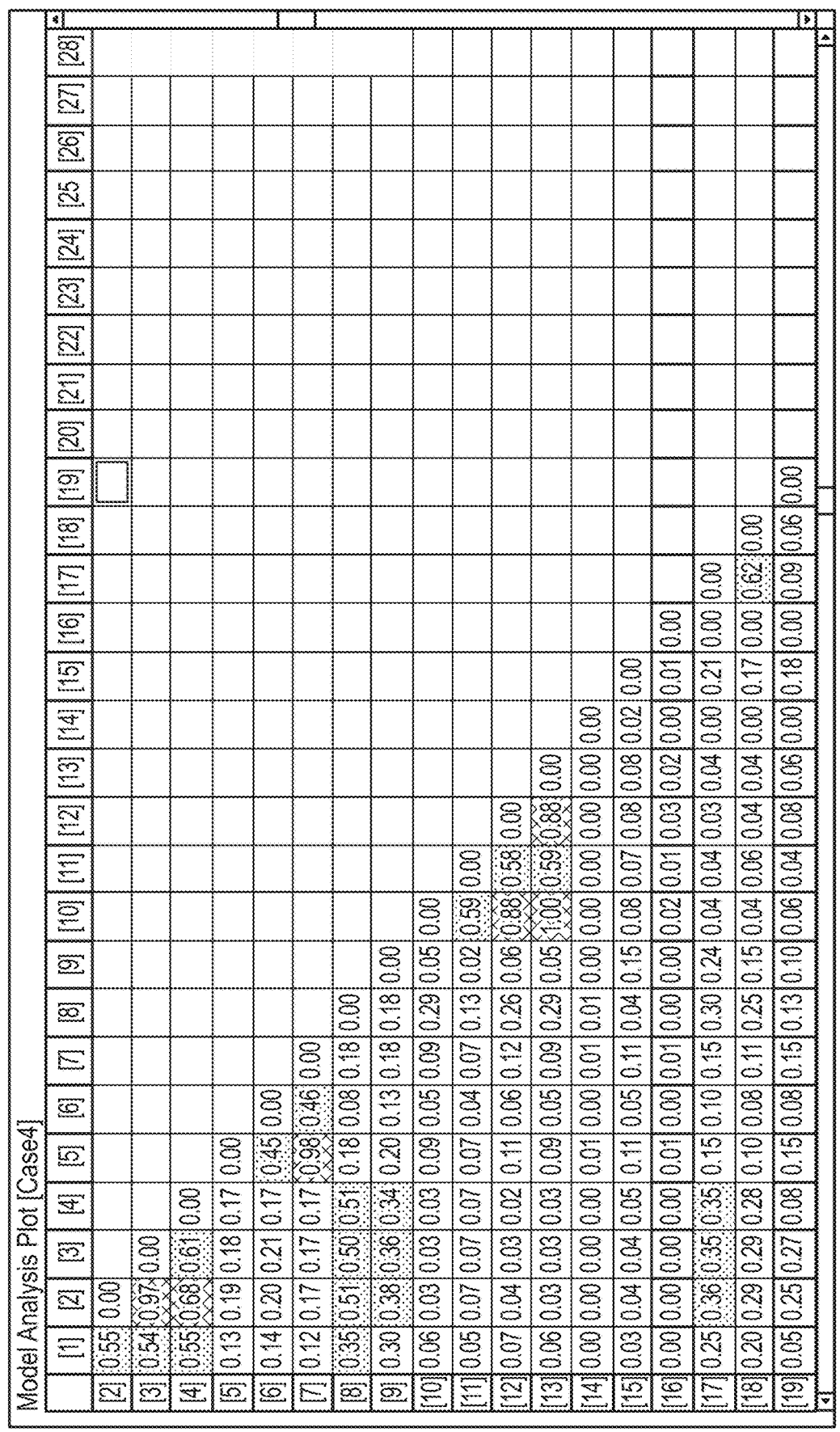
FIG. 2D illustrates a data chart of example results from a cross-correlation analysis performed in embodiments of the present invention.

FIG. 2D illustrates a chart of example dynamic cross-correlation analysis results from an embodiment of method 100 (step 120). FIG. 2D shows an overview summary correlation table of the calculated maximum cross-correlation coefficient score between pairs of inputs (horizontal axis vs. vertical axis) of a cleansed/enriched dataset over a specified time window. Each cell shows the maximum cross-correlation (in magnitude) between the input pair numbered in X-axis vs. Y-axis (e.g., cell [2]-[3] shows a coefficient value of 0.97, a highly correlated input pair). The calculated maximum cross-correlation coefficient scores in white are less correlated inputs (far below the defined global correlation threshold value). The calculated maximum cross-correlation coefficient scores in a dotted pattern are moderate correlated inputs and the scores in a cross pattern are above the defined global correlation threshold value. The correlated pairs (x-y cells) of inputs corresponding to the scores in cross pattern are put into a high-correlation group (e.g., cell [2] [3] having score 0.97, and cell [5] [7] having score 0.98).

Figure 2E:
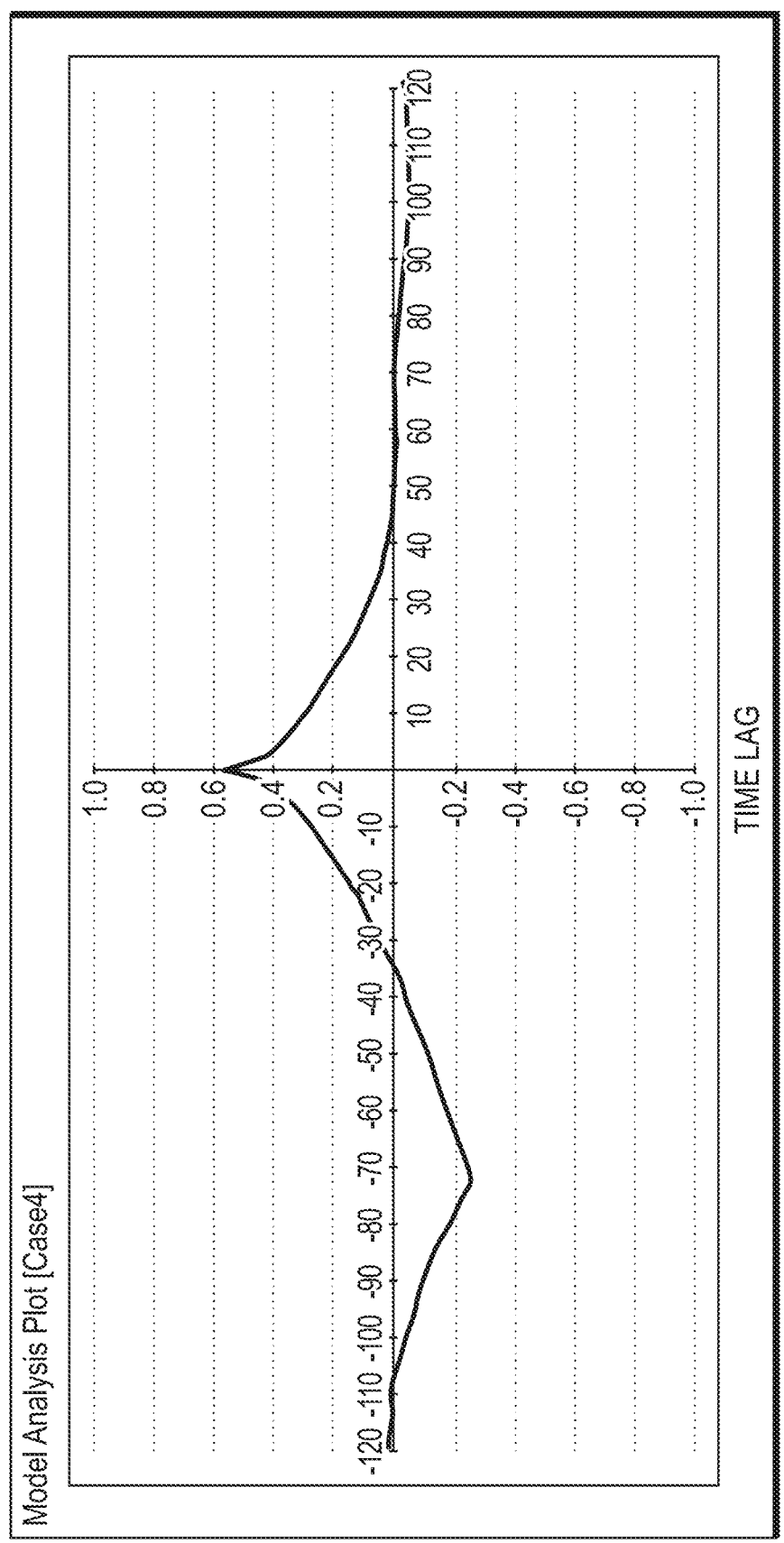
FIG. 2E-2F illustrate a data chart depicting a cross-correlation analysis of a pair of inputs/features in embodiments of the present invention.
Figure 2F:
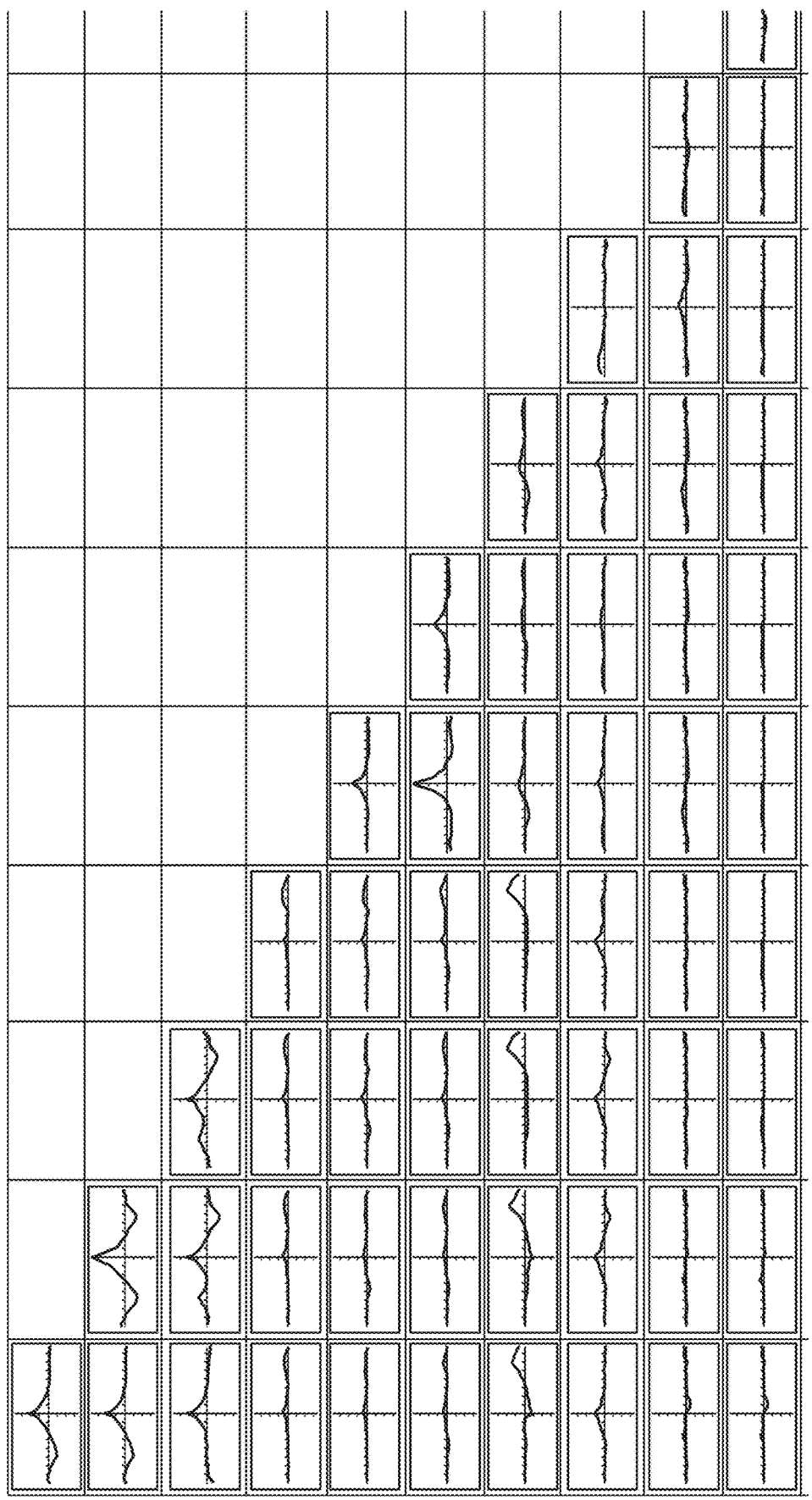

FIG. 2E illustrates an example plot (curve) of a complete cross-correlation coefficients trend over a specified 240 minutes window between a first input and second input of a cleansed/enriched dataset, according to embodiments of the present invention. FIG. 2F illustrates example plots (curves) of the complete correlation coefficients trends over a specified 240 minutes window between different pairs of inputs of the cleansed/enriched dataset, according to embodiments of the present invention.

Perform Preliminary Feature Selection

The method 100, at step 125, receives the cleansed/enriched input dataset from step 115 and the input correlation list of ranked highly correlated groups of inputs from step 120. The enriched dataset includes both the measurements process variables remaining after the cleansing/repairing of the original dataset in step 110 and the values of derived feature variables from step 115. Each measurement or derived value of the enriched input dataset is referred to as a "candidate feature." The method 100 (step 125) considers each candidate feature as input for a linear regression model. The method 100 (step 125) may use a stepwise linear regression with forward selection method to select those candidate features that show significant contributions in improving a linear regression model to predict one or more failure events of the subject process.

Figure 1C:
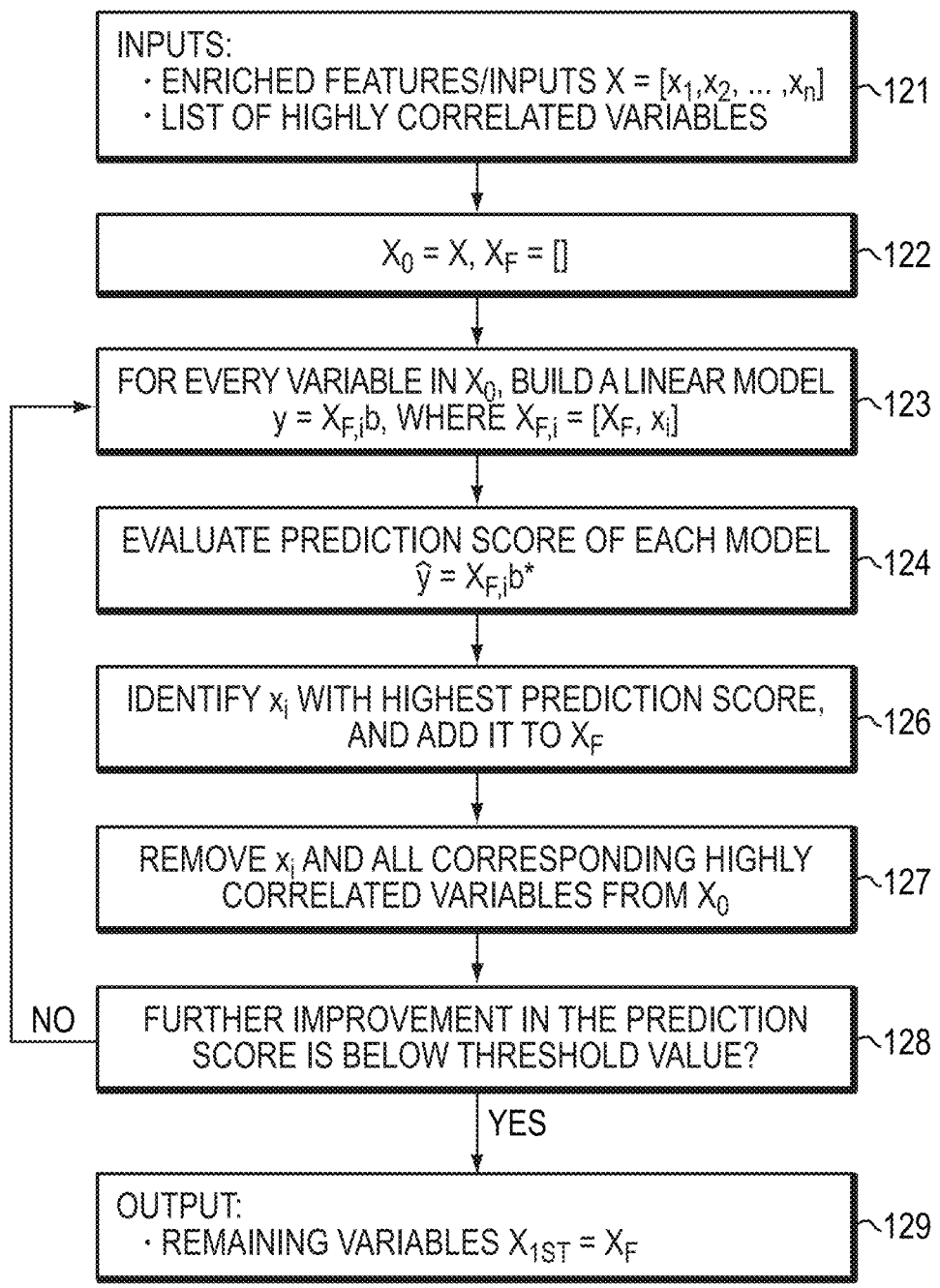
FIG. 1C illustrates a flowchart of an example method for preliminary feature selection in embodiments of the present invention.

To perform preliminary feature selection, the method 100 (step 125) may use the example method 125 illustrated in FIG. 1C, which is a stepwise linear regression with forward selection method. The method 125 of FIG. 1C performs the preliminary feature selection, at step 121, by first receiving the measurements and derived values (candidate features) $X=[x_1, x_2, \ldots, x_n]$ from step 115, and the list of highly correlated groups of inputs (input correlation list) from step 120. $x_1$ represents a vector of size m×1, where m is the number of observations of a given candidate feature, which consists of the measured/derived values of the ith input. The method 125, at step 122, initializes matrix $X_0$ (an m×n matrix, where n represents the number of remaining candidate features in the enriched dataset) equal to X, and matrix $X_F$ (input sub-dataset) is an empty matrix. For every variable $x_i$ in $X_0$, the method 125, at step 123, builds a linear model: $y=X_{F,i}b$, where $X_{F,i}=[X_F, x_i]$ and b are the coefficients vectors to be determined by the regression. The system of equations $y=X_{F,i}b$ is solved using the linear least squares solution: $b^*=(X_{F,i}^T X_{F,i})^{-1} X_{F,i}^T y$. The value being predicted by the model is y (vector of size m×1), which is the estimated probability of the failure event at each observation ($y \in [0,1]$). y is generated automatically based on information of pre-failure and post-failure interval durations (i.e., timespans before and after the failure event occurrences, respectively).

The method 125, at step 124, evaluates the prediction quality of each built linear model by calculating a prediction score. The prediction score for the preliminary feature selection is the $R^2$ value. The $R^2$ value is computed using the following equation: $R^2=\Sigma_i(\hat{y}_i-\bar{y})^2/\Sigma_i(Y_i-\bar{y})^2$, where $y_i$ is the estimated probability of the failure event at observation i, $\hat{y}_i$ is the predicted probability of the failure event (computed using $\hat{y}=X_{F,i}b^*$) at observation i, and $\bar{y}$ is the average value of y. The method 125, at step 126, identifies the $x_i$ with the highest prediction score and adds that identified $x_i$ to $X_F$.

The method 125, at step 127, removes $x_i$ and all corresponding highly correlated inputs from $X_0$. Step 127 removes $x_i$ since $x_i$ has already been added to $X_F$ and it is not necessary to test $x_i$ again. In this way, the method 125 selects only one candidate feature from each highly correlated group and disqualifies the other candidate features in the same highly correlated group. As the number of highly correlated candidate features increase due to feature enrichment in step 115 (which is the case usually), many correlated input measurements are removed from the selection process in step 125. Once a candidate feature is selected as part of the linear regression model, no further evaluation is performed on the candidate feature.

The method 125, at step 128, next checks if the prediction score increment is below a defined threshold value. If not below the defined threshold value, the method 125 returns to step 123 (for computing further improvement in prediction score). Otherwise, the method 125, at step 129, outputs the selected candidate features (i.e., candidate features added to $X_F$) as input sub-dataset $X_{1ST}=X_F$.

Perform Secondary Feature Selection and Build PLS Model

The method 100, at step 130, further evaluates each candidate feature of the input sub-dataset (selected in step 125), in combination with an examination of a candidate failure predictive model. The method 100 (step 130) varies the time intervals for model training and model testing (validation). At each time interval combination, the method 100 (step 130) may reduce the input sub-dataset using the same approach as in step 125 (e.g., stepwise linear regression with forward selection method), but with 2 differences: i) at each time interval combination, the method start with $X=X_{1ST}$, and ii) the prediction score of each candidate feature in the input sub-dataset is calculated based on the number of true positives, false positives, alert times, and error of predictions of the associated linear regression model. The prediction score for the secondary feature selection is denoted as F.

The prediction score F is calculated using the following equation:

$$F=a_0(\text{NTP})+a_1(\text{NFP})+a_2(\text{RTA})+a_3(\text{RMSE})$$

Where $a_0, a_1, \ldots, a_3$ are real numbers, NTP is the number of true positives, NFP is the number of false positives, RTA is the relative time of alert, and RMSE is root mean square error of prediction. RTA is calculated as follows:

$$RTA = \frac{1}{\#\text{Events}} \sum_{i=1}^{\#Events} \left( \frac{tend_i - talert_i}{tend_i - tstart_i} \right)$$

Where #Events is equal to the number of failure events, tend is the time of the ith failure event (i.e., the end of the ith pre-failure interval), $tstart_i$ is the start time of the ith pre-failure event, and $talert_i$ is the earliest alert triggered within the ith pre-failure interval.

The number of true positives (NTP) is defined as the number of failure events where at least one alert was triggered in the corresponding pre-failure interval. The number of false positives (NFP) is defined as the number of alerts triggered during time intervals considered as normal (i.e., time intervals where the system/asset is online and no failure event is developing or occurring).

The root mean squared error (RMSE) is calculated as follows:

$$RMSE = \sqrt{\frac{\sum_{i=1}^{m}(\hat{y}_i - y_i)^2}{m}}$$

Where m is the number of observations, $y_i$ is the estimated probability of the failure event at observation i, and $\hat{y}_i$ is the predicted probability of the failure event at observation i.

Due to change of time intervals, each candidate feature in the input sub-dataset may now show different sensitivities, and, therefore, some of these candidate features may be removed from the input sub-dataset based on no longer contributing to the linear regression model improvement. In such a way, the method 100 (step 130) automatically reduces the dimensionality of the input sub-dataset from step 125, and, at the same time, determines the failure events and time ranges with normal operating conditions to use for training the failure model.

After reducing the input sub-dataset of candidate process variables, the method 100 (step 130) builds a PLS model. The variable to be predicted by the model is the estimated probability of the failure event (i.e., y). The number of latent variables of the PLS model is automatically determined based on the maximum prediction score F found by increasing the number of latent variables one by one, for example, starting from 4 (the minimum number of features used to build the model) and up to 30, and evaluating prediction score F for each number of latent variables.

To select events and normal time ranges, the method 100 (step 130) may use a stratified k-fold cross-validation approach based on the classification of process observations (normal, pre-failure, post-failure, etc.). Stratification involves rearranging the data as to ensure each fold is a good representative of the whole input sub-dataset. For example, if the whole consists of 100 observations, 70 of them labeled as normal and 30 as abnormal, if the fold were to have 3 abnormal observations, it should have around 7 normal observations to keep the same proportion of the whole. The method 100 (step 130) selects the events and normal time ranges at which the model computes the highest prediction score F as the optimal events and normal time ranges for predicting the identified failures in the subject plant process.

Figure 1D:
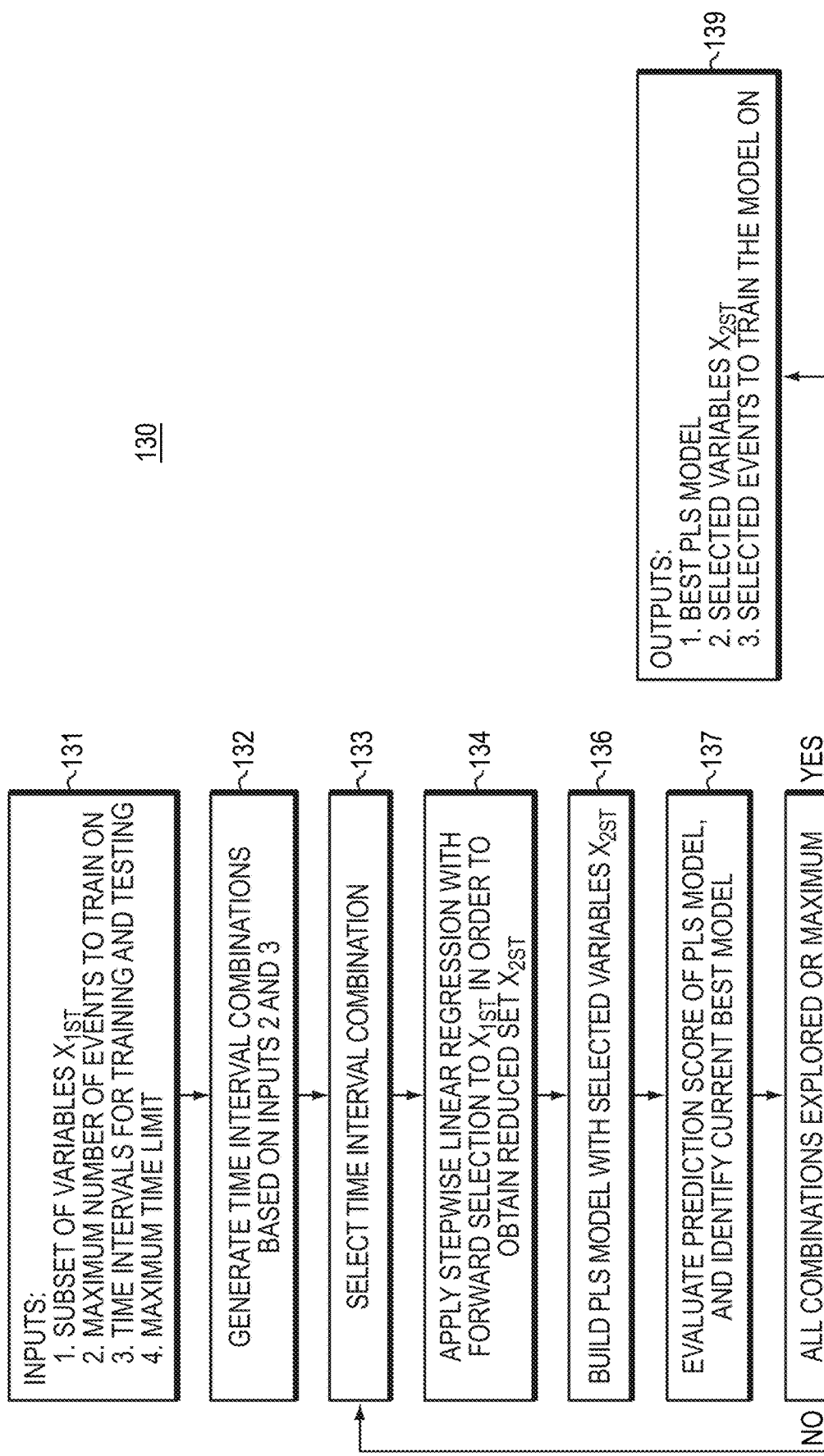
FIG. 1D illustrates a flowchart of an example method for secondary feature selection in embodiments of the present invention.

To perform secondary feature selection, the method 100 (step 130) may use the example method 130 illustrated in FIG. 1D. The method 130 of FIG. 1D performs the secondary feature selection, at step 131, by first providing input. The input includes: (1) a sub-dataset from step 125 (subset of inputs from the dataset from step 115) $X_{1ST}$, (2) a maximum number of events used to train the model, (3) time intervals for training and testing the model, and (4) maximum time limit. The method 130, at step 132, then generates time interval combinations based on inputs (2) and (3) using a stratified k-fold cross-validation approach. The method 130, at step 133, next selects one of the time interval combinations (the method will explore all time interval combinations generated, one by one). For the selected time interval combination, the method 130, at step 134, applies stepwise linear regression with forward selection method to $X_{1ST}$ in order to obtain a reduced sub-dataset $X_{2ST}$ by selecting inputs from $X_{1ST}$ (full procedure described in Preliminary Feature Selection, but using prediction score F instead of $R^2$, and $X=X_{1ST}$ at the beginning of each time interval combination). The method 130, at step 136, builds a PLS model with the selected variables of the reduced sub-dataset $X_{2ST}$. The method 130, at step 137, generates and evaluates prediction score F of the PLS model, and identifies the PLS model as the best model currently built if its prediction score F is greater than the previous largest model prediction score. The model 130, at step 138, then checks if all time interval combinations have been explored or if the maximum time limit ((4) of step 131) is reached. If not reached, the method 130 returns to step 133. Otherwise, the method, at step 139, returns output including: (1) the best PLS model, (2) selected variables $X_{2ST}$ (final sub-dataset), and (3) selected events to train the failure model (i.e., the failure events used for training the model in the time interval combination for which the PLS model had the largest prediction score F).

Alternatively, some embodiments may further reduce the size of the input sub-dataset by applying a multivariate statistical model, such as a PLS model. The applied multivariate statistical model projects the remaining inputs in the input sub-dataset into a lower dimension latent structure space that maximizes the covariance with a defined failure indicator. The failure indicator is defined to be synchronized to measurements associated with one or more failures in the subject industrial process. In some embodiments, the defined failure indicator is a Boolean flag variable that synchronizes to historical measurements of at least one of: historical plant failures across the subject industrial process, of a representative failure/event process variable of the subject industrial process, or of a specific time window of historical data before an event/failure (pre-failure-window) for the subject industrial process.

Based on the projection, the embodiments determine contribution coefficients indicating statistical contribution of each input of the sub-dataset to the defined failure indicator in terms of magnitudes and directions. The embodiments then provide the inputs in ranked order of the determined contribution coefficients. Based on the ranking, the embodiments remove from the input sub-dataset one or more inputs having contribution coefficients showing insignificant statistical contribution or with high uncertainty in statistical confidence, resulting in only one of a highly correlated input group remaining in the input sub-dataset.

If there are still more than one highly correlated input after the removal, optionally, the multivariate statistical model automatically selects a small subset of the projected variables (called a "latent variable") that contributes most to failures in the subject process in the input sub-dataset. The embodiments determine the subset by truncating the latent variables using a reduced-order and best fit model. The statistical model selects the small subset without losing important measurement information from the candidate inputs.

Build Failure Detection and Prediction Model (FDPM)

The method 100, at step 135, then builds a failure detection and prediction model (FDPM) for the subject process. To build the FDPM model, the method 100 (step 135) may re-build a PLS predictive model or build a deep-learning neural network (DLNN) model for detecting, predicting, and preventing the identified plant process failure. For example, the embodiments may use the selected small set of process variables (reduced sub-dataset from step 130) as inputs to build and train a DLNN model as described in U.S. Pat. No. 9,535,808 B2, which is incorporated herein by reference in its entirety, as the FDPM model. The method 100 (step 135) may partition the sub-dataset over time and train a FDPM model with one or more failure event data (as training dataset), while reserving one or more other known failure event data (as validation dataset) to validate the FDPM model. The method 100 (step 135) may use the sub-dataset with the process variables and enriched feature variables reduced in steps 110-130, and/or truncated PLS model latent variables. The method 100 (step 135) may train the FDPM model for at least one of online normal/anomaly detection, online failure signature recognition detection, and failure prediction warning.

Deploy FDPM Online

The method 100, at step 140, deploys the FDPM model online for continuous monitoring of the subject plant process to detect/predict current and future process failure events. The method 100 (step 140) receives real-time measurements from plant sensors, online analyzer readings, and lab sample analysis results, and such, may also apply transformations or engineering equations to derive feature variables' values from the real-time measurements, and together are fed into the FDPM model.

From the real-time measurements and derived feature variables' values, the FDPM model may generate current estimates of the equipment or process health status, in a format of continuous key performance indicators (KPIs) used as indicators of the process failure (identified in step 105) over time. The generated KPIs from FDPM are very important and helpful for a plant user (e.g., process engineer/operator) or plant system to monitor and maintain the operations of the subject plant process at a safe or optimal operation condition. For example, the plant user or system may use the KPIs to indicate current or future failures in the subject plant process, such as distillation columns' flooding, foaming or a reactors' operation risk factor, and such. The generated KPIs may be further used to perform root-cause analysis on the operations of the subject process. The deployed FDPM model may also perform signature detection (e.g., using the KPIs) to indicate the identified process failure (in step 145) in the current real-time online data of the subject plant process. For example, from the real-time measurements, the FDPM model may also detect failure events in the subject process by classifying and handle both accumulative and abrupt signatures.

Figure 1E:
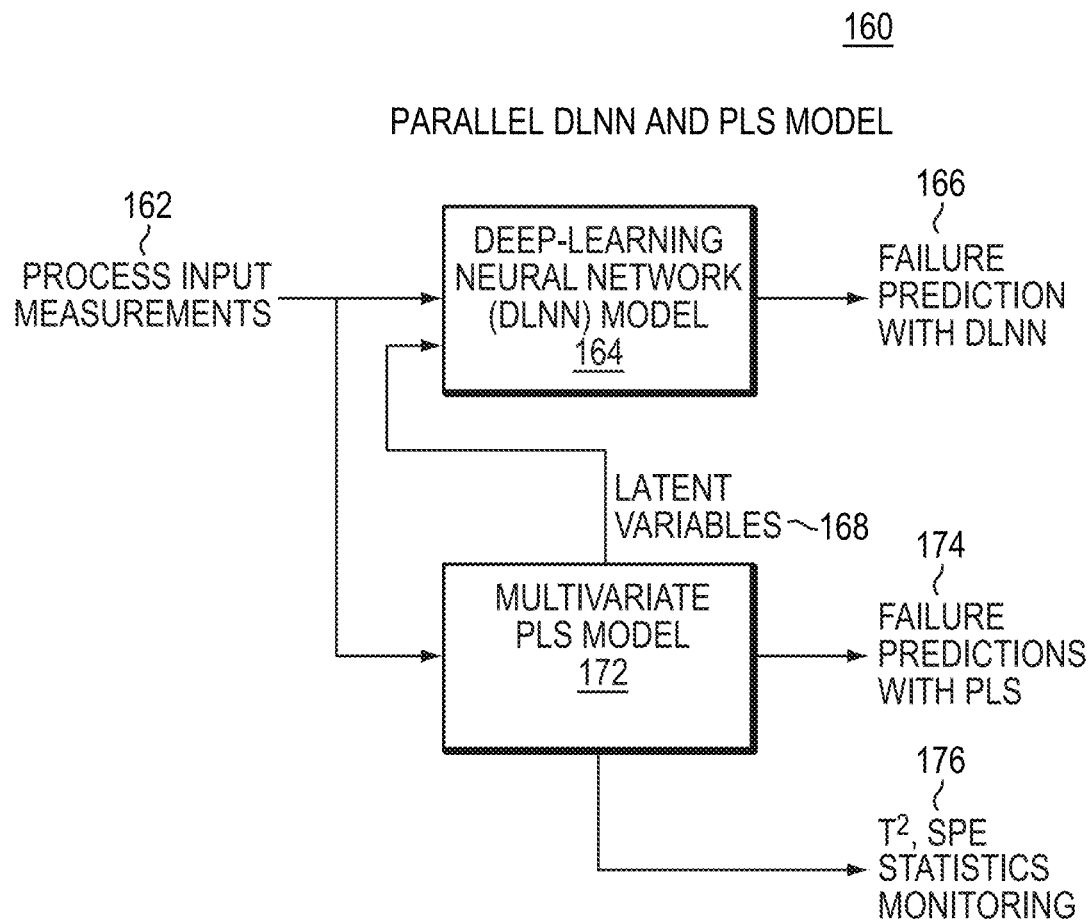
FIG. 1E illustrates an example method for running a failure detection and prediction DLNN model and a PLS model in parallel in embodiments of the present invention.

The method 100, at step 145, may further deploy the PLS model 172 from the final sub-dataset (resulting from step 130) that is run in parallel to the FDPM (DLNN) model 164. As shown in FIG. 1E, the FDPM (DLNN) failure model 164 accepts real-time process measurements 162 as inputs, along with one or more derived feature variables' values computed from a transformation, engineering calculation, or statistical values of one or more real-time process measurements (if any are defined in the training) as input. Using the inputs, the FDPM model then generates predictions represented as a failure indicator value between the range of 0.0-1.0. The same real-time measurements and derived feature variables values are also fed into the parallel PLS model 172. The parallel PLS model 172 is run simultaneously with the FDPM model 164 and also generates a continuous failure indicator value (0.0-1.0), as well as a PLS model Hoteling's $T^2$ value and a Squared Projection Error (SPE or $Q^2$) value, as output 176. To do so, the PLS model 172 transforms inputs 162 into PLS model latent variable values 168 using a PLS model structure mapping, such as: $X=TP^T$, $Y=Tw$, where T is a dimension reduced independent latent variables, and w is a dimension reduced linear regression coefficient vector. Additionally, the PLS model 172 generates statistical indexes such as SPE and $T^2$ associated with output 174 from the PLS model 172. The generated statistical indexes are important statistics, which provide a Key Performance Indicator (KPI) used to monitor the model inputs to detect significant changes in correlation structure of the inputs and the output event prediction errors.

Further, the method 100 (step 145) may deploy one or more failure models built and trained to perform anomaly detection, signature recognition, and/or failure prediction warning for analyzing the current real-time online data of the subject plant process. These models may compare the current real-time data of the subject plant process to historical data of the subject plant process. Based on the comparison, one or more models identify non-normal or anomalous conditions in the subject plant process. The method 100 stops at step 148.

In practice, multiple predictive failure models can be developed and deployed in a same computer server (or cloud computing environment) and run simultaneously, which allow process operator and engineer to operate and monitor their plant with more transparency and process insights. Embodiments assist a process operator and engineer to develop and deploy multiple predictive failure models in an easy workflow and to support equipment/process failure early detection and for a long-term sustained safe operation and production, which supports manufacturers continually optimizing the performance of their assets—improving safety, managing risk, reducing downtime, enhancing productivity, and increasing profitability.

Example Applications of Building Process Failure Model

FIGS. 2A-2G illustrate data charts depicting the application of methods from data loading to train and test a failure model for a C2 Splitter with Hydrate Formation problem. FIG. 2A shows a flowsheet (P&ID diagram) of C2 Splitter Column in a petrochemical plant, including tags for the process variables of the C2 Splitter Column. Such a column produces hundreds of tons of chemicals per day. A process failure due to Hydrate Formation can cost the manufacturer millions of dollars for production loss. Therefore, an embodiment of the invention is applied to this application. FIG. 2B illustrates an example of plant operation measurements recorded from hundreds of online sensors in the petrochemical plant and stored in a plant historian. The plant operation measurements are loaded into a raw dataset (step 105 of method 100) from the plant historian. FIG. 2C illustrates an example of a few process variables of the dataset containing missing values and bad measurements. The raw dataset may be cleansed of such missing values and bad measurements (step 110 of method 100) to generate a cleansed dataset. The dataset is also enriched with one or more feature variables and corresponding values derived from the operation measurements of the dataset (step 115 of method 100).

FIG. 2D-2F illustrates an example of the results of correlation analysis (step 120 of method 100) on the cleansed/enriched dataset. FIG. 2D shows the example cross-correlation results in an overall correlation coefficients table. In the coefficient table of FIG. 2D, highly correlated pairs (x-y cells) of inputs (measurements and derived values of the dataset) with values greater than a pre-defined threshold are identified (in cross pattern) and put into a high-correlation tag group. FIGS. 2E-2F illustrates more details of example correlation function curves over a pre-defined time window (240 min or 4 hours). An application in the plant then performs preliminary feature selection (step 125 of method 100) and secondary feature selection (step 130 of method 100) on the dataset to reduce the dataset to only 31 selected inputs (of process variables' measurements and derived feature variables' values) to train/test the failure model for a C2 Splitter with Hydrate Formation problem. Further, the plant application builds and executes a PLS model using only the 31 inputs selected from a total of over 1000 variables as the failure model inputs and a historical process failure (alert) event as the failure model output.

Figure 2G:
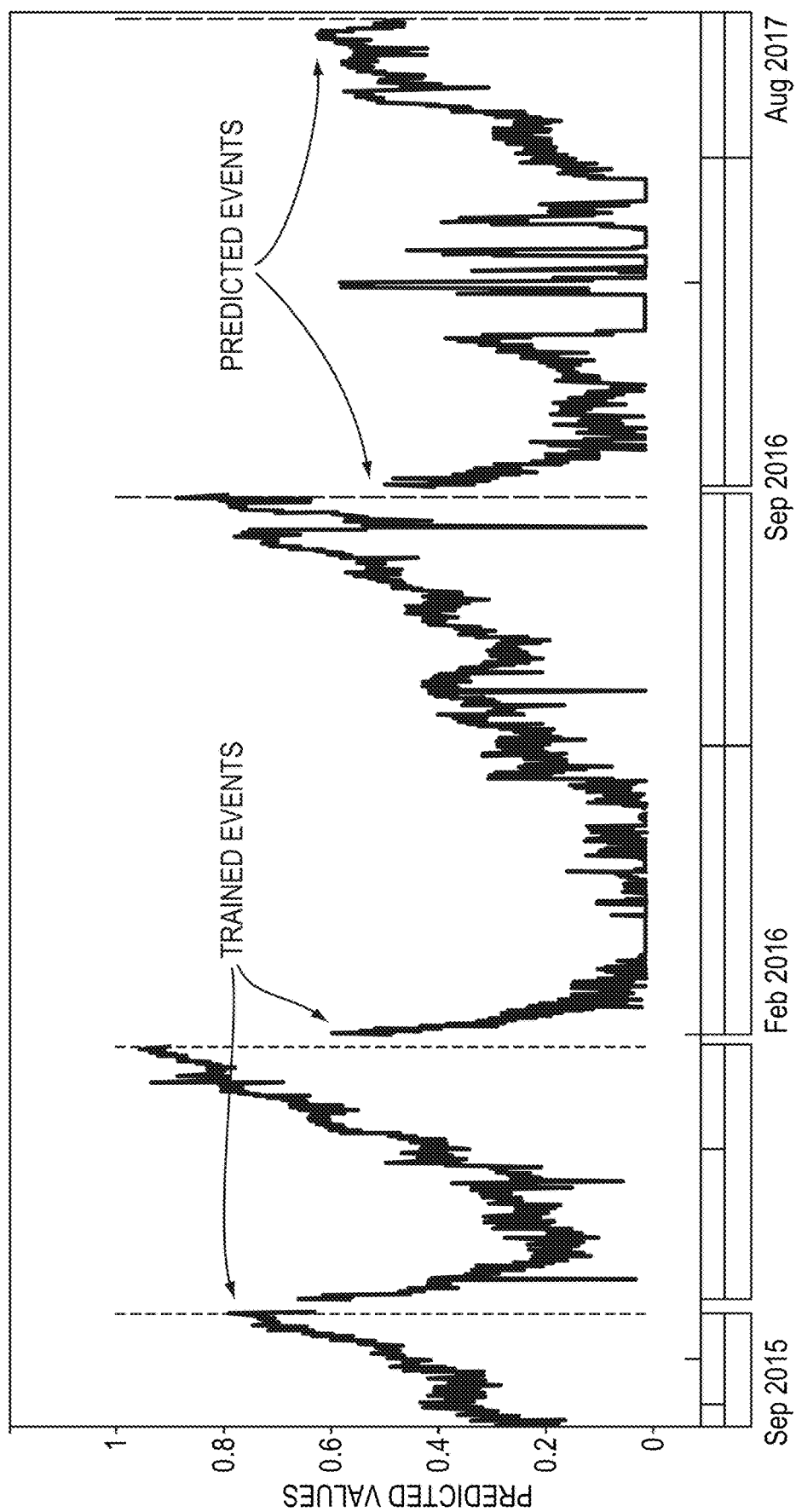
FIG. 2G illustrate an example data chart depicting the training and predicting performance of a PLS model applied to a C2 Splitter formation problem in embodiments of the present invention.

FIG. 2G illustrates a data chart plotting the model predicting a couple of known hydrate formation events of the C2 splitter used for training and another pair of failures for a Hydrate Formation events used for validation (or testing), both showing correct predictions and able to issue a warning to plant up to two-month early.

Figure 3:
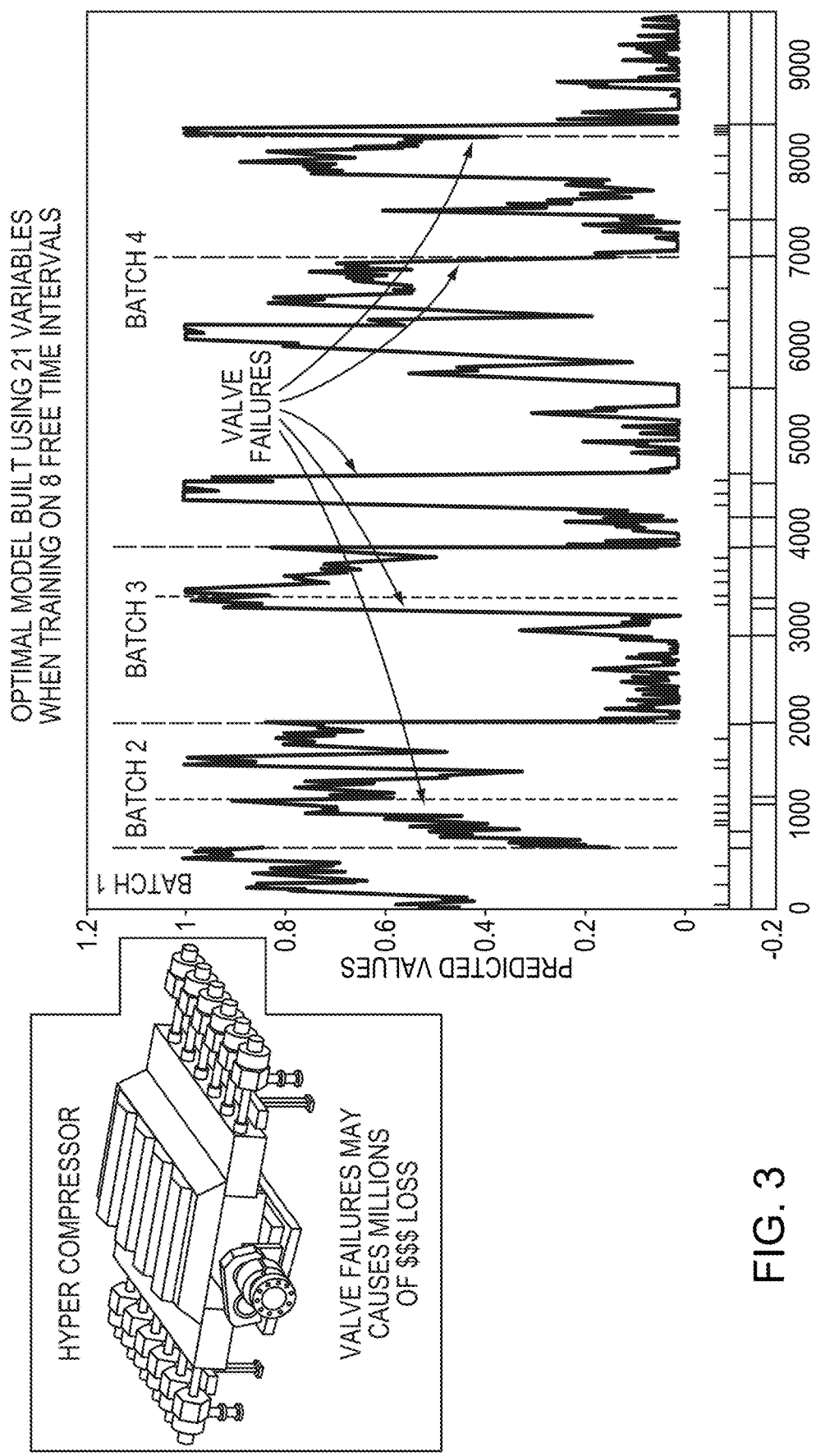
FIG. 3 illustrate an example data chart depicting the training and predicting performance of a PLS model applied to a Hyper Compressor Valve Failures in embodiments of the present invention.

FIG. 3 illustrates another example application of embodiments to a hyper compressor valve failure problem in an industrial process. A valve failure in a hyper compressor can cause millions of dollars of loss to the manufacturer. Embodiments of the present invention can be very valuable and beneficial to develop and deploy a model for predicting the hyper compressor valve failure before the failure event occurs. The application of the embodiments to the hyper compressor valve may be implemented using the method steps described in FIG. 1A-1E. As shown in FIG. 3, through the application of an embodiment, 21 inputs/features are selected from hundreds of initial measurements to form a sub-dataset. Using the sub-dataset, the shown PLS model is able to predict most valve failures (including both training and testing events) in an industrial process correctly up to one month ahead and issue a warning to the manufacturer.

Network Environment for Building and Deploying Failure Models

Figure 4A:
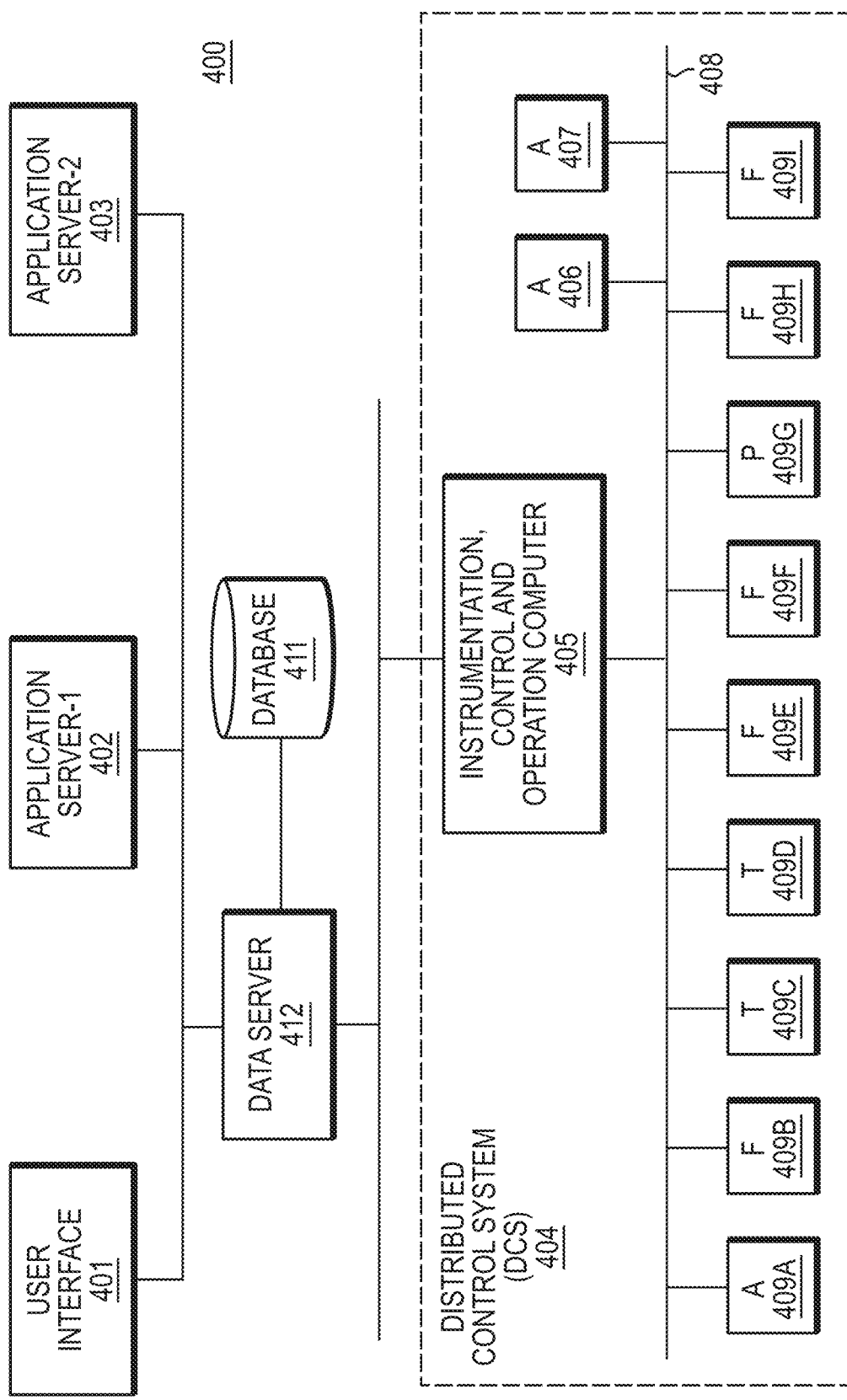
FIG. 4A illustrates a block diagram depicting an example computer network environment for building and deploying failure detection and prediction models in embodiments of the present invention.

FIG. 4A illustrates a block diagram depicting an example network environment 400 for building and deploying failure detection and prediction models in embodiments of the present invention. The system 400 may be configured as part of the computer network that supports the process operations of a chemical or industrial plant, or refinery, which includes a formidable number of measurable process variables, such as temperature, pressure and flow rate variables. In some embodiments, the network environment 400 executes the methods of FIGS. 1A-1E to build and deploy failure detection and prediction models to monitor real-time plant operations. FIG. 4C illustrates a block diagram of various functional computer modules used by the network environment in FIG. 4A to build and deploy failure detection and prediction models.

The system 400 of FIG. 4A includes a first application server (Application Server-1) and a second application server (Application Server-2) 403, which may operate as a failure detector and predictor. In some embodiments, each of the application servers 402, 403 may operate in real-time as the failure detector and predictor of the present invention alone, or the application servers 402, 403 may operate together as distributed processors contributing to real-time operations as a single failure detector and predictor. In other embodiments, additional system computers (application servers) may also operate as distributed processors contributing to the real-time operation as a failure detector and predictor.

The application servers 402, 403 may communicate with the data server 412 to access collected data for measurable process variables from a historian database 411. The data server 403 may be further communicatively coupled to a distributed control system (DCS) 404, or any other plant or refinery control system, which may be configured with instruments 409A-409I, that collect data at a regular sampling period (e.g., one sample per minute), and 406, 407 that collect data at an intermittent sampling such as online analyzers (e.g. 20-30 min per sample) for the measurable process variables. The instruments may communicate the collected data to an instrumentation computer 405, also configured in the DCS 404, and the instrumentation computer 405 may in turn communicate the collected data to the data server 412 over communications network 408. The data server 412 may then archive the collected data in the historian database 411 for failure modeling purposes. The data collected varies according to the type of subject (or target) plant process.

The collected data may include measurements for various measurable process variables. These measurements may include a feed stream flow rate as measured by a flow meter 409B, a feed stream temperature as measured by a temperature sensor 409C, component feed concentrations as determined by an analyzer 409A, and reflux stream temperature in a pipe as measured by a temperature sensor 409D. The collected data may also include measurements for process output stream variables, such as the concentration of produced materials, as measured by analyzers/instruments 406 and 407. The collected data may further include measurements for manipulated input variables, such as reflux flow rate as set by valve 409F and determined by flow meter 409H, a re-boiler steam flow rate as set by valve 409E and measured by flow meter 409I, and pressure in a column as controlled by a valve 409G. The collected data reflect the operation conditions of the representative plant during a particular sampling period. The collected data is archived in the historian database 411 for failure modeling purposes. The data collected varies according to the type of target process.

In FIG. 4A, Application Server-1 402 may be configured to include an input data preparation module 420 of FIG. 4C. The Application Server-1 402 is communicatively coupled to a user interface 401. From the user interface 401, a user (e.g., plant engineer, plant operator or other plant personnel) may initiate building of a failure detection and prediction model. To do so, the user, via the user interface 401, may select candidate process variables for building the failure detection and prediction model. For example, the user, through user interface 401, may interact with a plant piping and instrumentation diagram/drawing (P&ID), as shown in FIG. 2A, to view and select process variable tags (e.g., F1-8701 and TI-8701) to select candidate process variables for building the failure detection and prediction model.

In response, the user interface 401 may communicate with the data importer/exporter 422 of the input data preparation module 420 (configured on Application Server-1 402), which loads the historical plant measurements for the selected candidate variables, via the data server 412, from a database 411 (e.g., plant historian or asset database). The historical measurements may include data currently or previously collected from sensors, including 406-407, by the Instrumentation, Control, and Operation Computer 405 of the Distributed Control System (DCS) 404. The data importer/exporter 422 generates a dataset from the loaded historical measurements of the selected process variable candidates (which may be stored by the data importer/exporter 422 in database 411).

From the user interface 401, the user may then initiate steps of reducing the generated dataset for improved use in building and training the failure detection and prediction models. That is, the steps may preselect certain process variables, from which measurements may be sued to build and train the failure detection and prediction models. For example, the user, via user interface 401, may request data cleansing to be performed on the generated dataset (or a plant system of network environment 400 may automatically request the performance of data cleansing). In response, the user interface 401 may communicate with the input data preparation module 420 (of Application Server-1 402) to perform functions 424 on the dataset that may include data screening, slicing, repairing, and pre-processing to reduce the dataset (e.g., remove bad quality data segments and measurements for uninformative process variables). In some embodiments, the input data preparation module 420 may execute step 115 of method 100 to perform input feature enrichment on the dataset.

The user, via user interface 401, may also request input feature enrichment and dynamic cross-correlation analysis be performed on the generated dataset (or a plant system of network environment 400 may automatically request the input feature enrichment and cross-correlation analysis). In response, the user interface 401 may communicate with the input data preparation module 420 (of Application Server-1 402) to perform functions 426 to generate various feature enriched variables' values as inputs added to the dataset stored in database 411. The preparation module 420 then dynamically analyzes the correlation of the enriched variables' values and measured process variables' values using steps 115-120 of method 100. The input data preparation module 420 may further identify highly correlated input variable groups based on the cross-correlation analysis as described in method 100 (step 120). The input data preparation module 420 may further reduce the enriched dataset by removing identified redundant inputs in each highly correlated input group, and eliminating less-contributed inputs through preliminary and secondary feature selections to generate a sub-dataset.

The user, via user interface 401, may also request feature selection and statistical modeling (PLS modeling) be performed on the enriched dataset (or a plant system of network environment 400 may automatically request the feature selection and PLS modeling). In response, the user interface 401 may communicate with the input data preparation module 420 (of Application Server-1 402) to perform functions 428 to select final input variables for the failure model through a preliminary feature selection and a secondary feature selection processes (step 125-135 of method 100). The module 420 (of Application Server-1 402) may further build and execute a PLS model. In some embodiments, the build/executed model may project the remaining measurements/derived values of variables of the sub-dataset into a lower dimension latent structure space. Based on the projection, the PLS model determines the set of projected values of variables that most contribute to the set of past failures of the subject process and determines latent process variables of the projection. The input data preparation module 420 may further reduce the dataset to include only those measurements/derived values determined to most contribute to the set of past failures. The input data preparation module 420 may also truncate the determined latent variables for use in building/training the failure detection and prediction models. The reduced dataset and determined latent variables may be stored in the database 411.

In FIG. 4A, Application Server-2 403 may be configured as a model training module 430 and model execution module 440. The Application Server-2 403 is communicatively coupled to Application Server-1 402 and the user interface 401. From the user interface 401, a user (e.g., plant engineer, plant operator or other plant personnel) may initiate building and training the failure detection and prevention models. In response, the user interface 401 may communicate with the model training module 430, to build the failure detection and prediction models. The model training module 430, using the reduced dataset or determined latent variables, performs functions for training the failure detection and prediction models for anomaly detection 432 and/or failure signature recognition 434. The model training module 430 then validates the built/trained failure detection and prediction models and deploys the models online.

Using the deployed failure detection and prediction models, the model execution module 440 may perform anomaly detection online 444, failure signature recognition online 446, and failure prediction warning 448 on real-time operations of a plant process. The model execution module 440 may also run a PLS model based on the sub-dataset or determined latent variables. The model execution module 440 may use the PLS model in parallel with the deployed failure detection and prediction models, to perform input monitoring 442 using statistics (e.g., T2, SPE, and such) generated from the PLS model.

The model execution module 440 may also automatically provide input (adjust parameters/variables/constraints) to the DCS 404, or any other plant or refinery control system or processing system coupled to the DCS system 404, in response to the anomaly detection 444, failure signature recognition 446, and failure prediction warning 448. The Instrumentation, Control, Operation Computer 405, based on the input, may then automatically adjust or program (via network 408) physical valves, actuators, heaters, and the like 409A-409I, or program any other plant or refinery control system or processing system coupled to the DCS system 404, to prevent or stop occurrence of a failure event in the plant process. The model execution module 440 may also provide anomaly detection 444, failure signature recognition 446, and failure prediction warning 448 results to the user interface 401 for presentation to the user, and the user, via the user interface 401, may initiate actions (e.g., adjust or program physical equipment) at the DCS system 404 or other plant or refinery control system or processing system coupled to the DCS system 404. In this way, embodiments supports manufacturers continually optimizing the performance of their assets—improving safety, managing risk, reducing downtime, enhancing productivity, and increasing profitability.

Figure 4B:
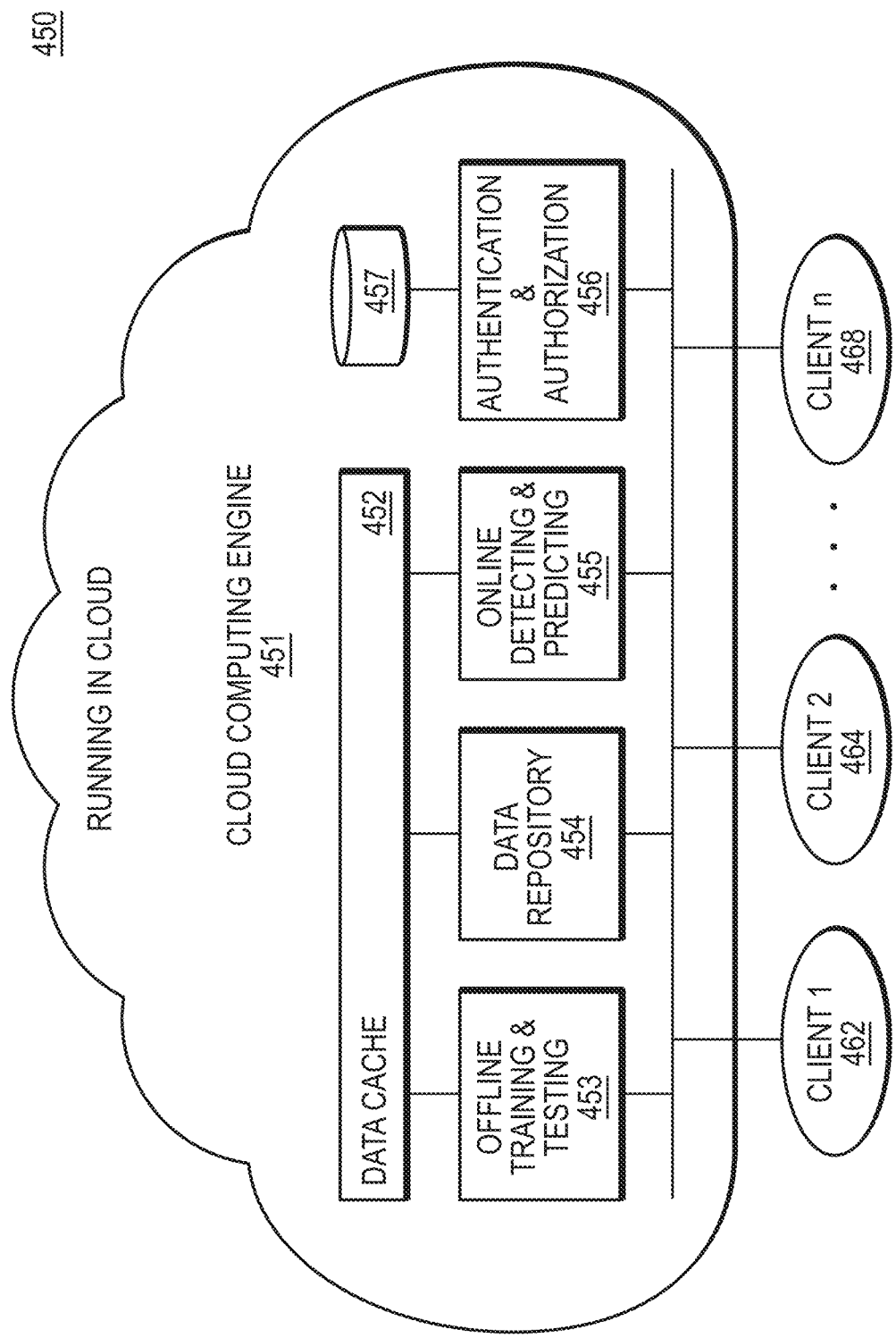
FIG. 4B illustrates a block diagram depicting an example computer clouds environment for building and deploying failure detection and prediction models in embodiments of the present invention.
Figure 4C:
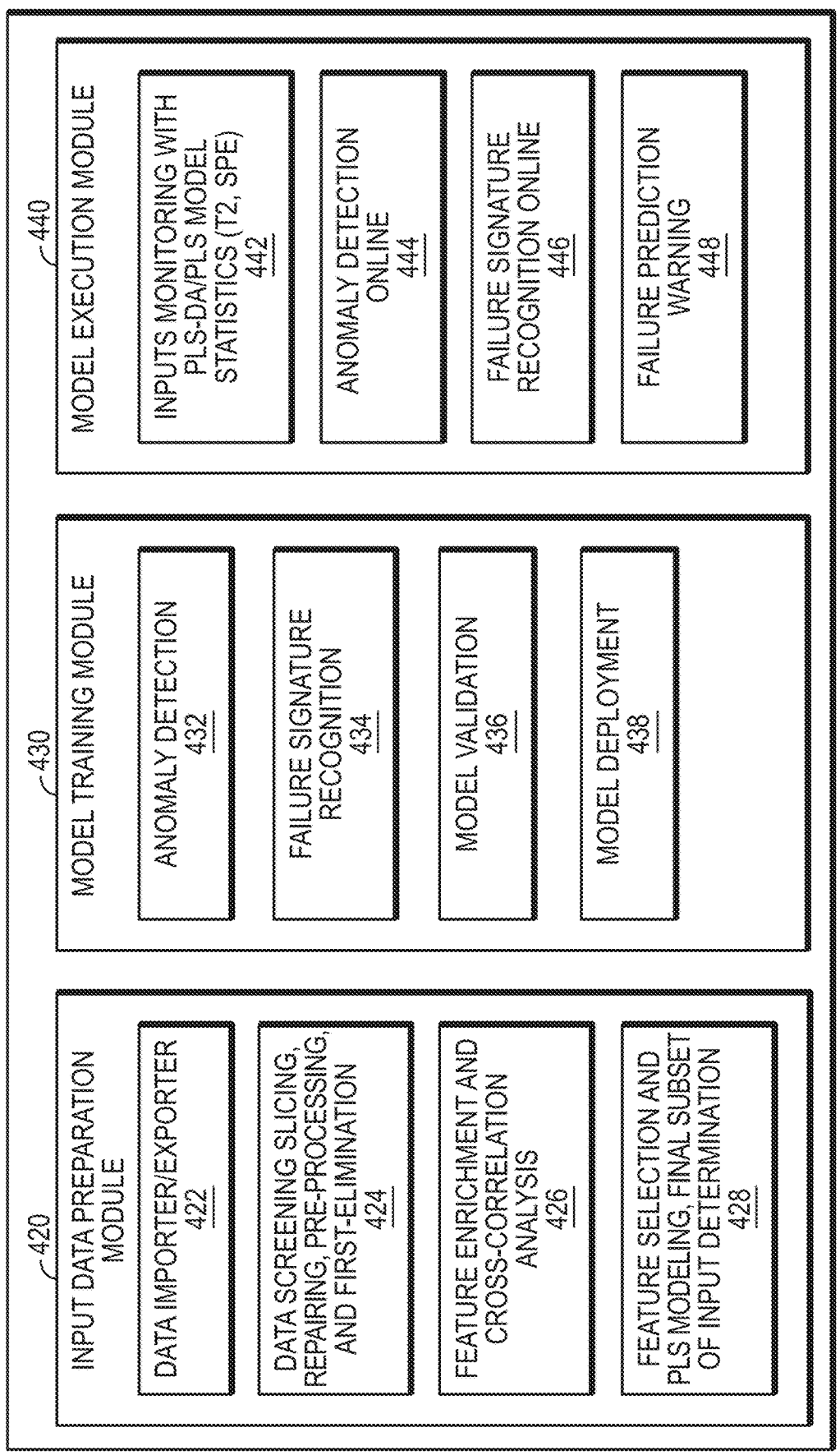
FIG. 4C illustrates a block diagram of various functional computer modules used by the network environment in FIG. 4A/4B to build and deploy failure detection and prediction models.

FIG. 4B illustrates a block diagram depicting an example cloud computing environment 450 for building and deploying failure detection and prediction models in embodiments of the present invention. Such an environment 450 is capable of handling a large number of applications and, in super-fast-speed, performing multiple tasks related to modeling and predicting process and equipment failures. The environment 450 of FIG. 4B can perform the method 100 steps described in FIGS. 1A-1E. The cloud computing environment 450 includes a cloud computing engine 451 configured to perform offline model training and testing 453, online model detecting and predicting 455, and authentication and authorization 456. The cloud computing engine 451 is also coupled to a data repository 454, data cache 452, and authentication & authorization database 457. The cloud computing engine 451 receives requests from any one of the shown clients 462, 464 . . . , 468. The cloud computing engine 451 checks the received requests by completing authentication and authorization 456 on the received request. The cloud computing engine 451 only executes tasks that are permitted according to the authentication and authorization 456 (i.e., what to do, what can do, and how to do it). Using authenticated/authorized requests, the powerful cloud computing engine 451, in a super-fast way, builds, trains, and tests 453 failure models and deploys these failure models online to detect and predict 455 plant or equipment failures in a subject process. The cloud computing engine 451 then send back results and reports to the clients 462, 464 . . . , 468.

Digital Processing Environment

Figure 5:
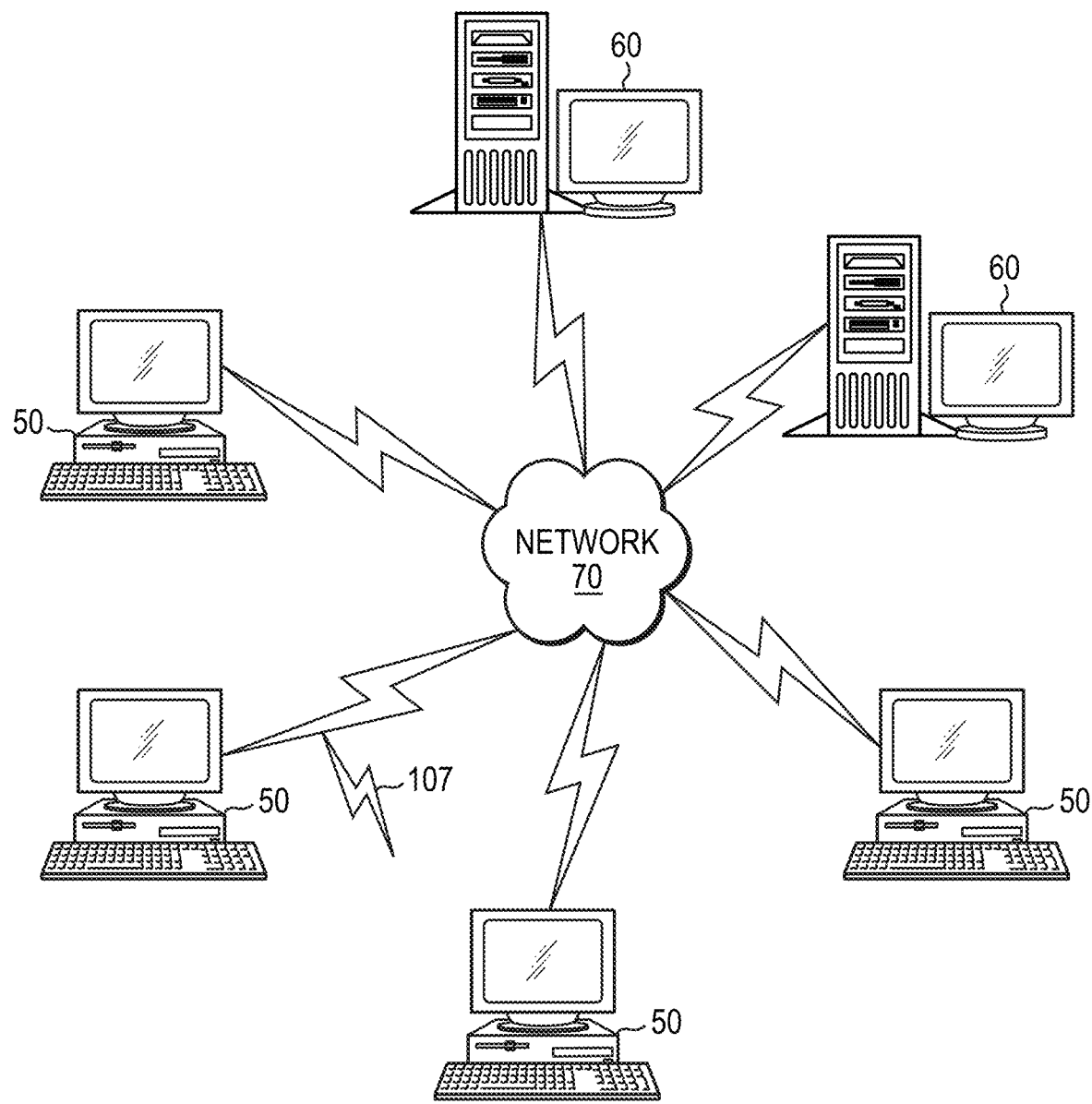
FIG. 5 is a schematic view of an example computer network in which embodiments of the present invention may be implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate 107 with one another. Other electronic device/computer network architectures are suitable.

For example, server computers 60 may also be configured as Data Server 412 for loading historical plant data (e.g., measurements and enriched feature values) from Database 411 into a dataset in the network architecture 400 (e.g., by executing step 105 of method 100). Server computers 60 may also be configured as Application Server-1 402 (including an input data preparation module 420) to reduce process variables' measurements and enriched feature variables' values from the dataset (e.g., by executing steps 115-135 of method 100). Server computers 60 may further be configured as Application Server-2 403 (including model training module 430 and model execution module 440) to build and deploy a failure detection and prediction model (e.g., by executing steps 135-145 of method 100). The server computers 60 may also be configured as an Instrumentation, Control, and Operation Computer 405 that is configured as part of the Distributed Control System (DCS) 404 in the network architecture 400. The Instrumentation, Control, and Operation Computer 405 may be communicatively coupled to client devices 50, including sensors 406-407 and other measurement control devices (valves, actuators, heaters, and the like 409A-I) for adjusting a plant process based on the built and deployed failure detection and prediction model.

Figure 6:
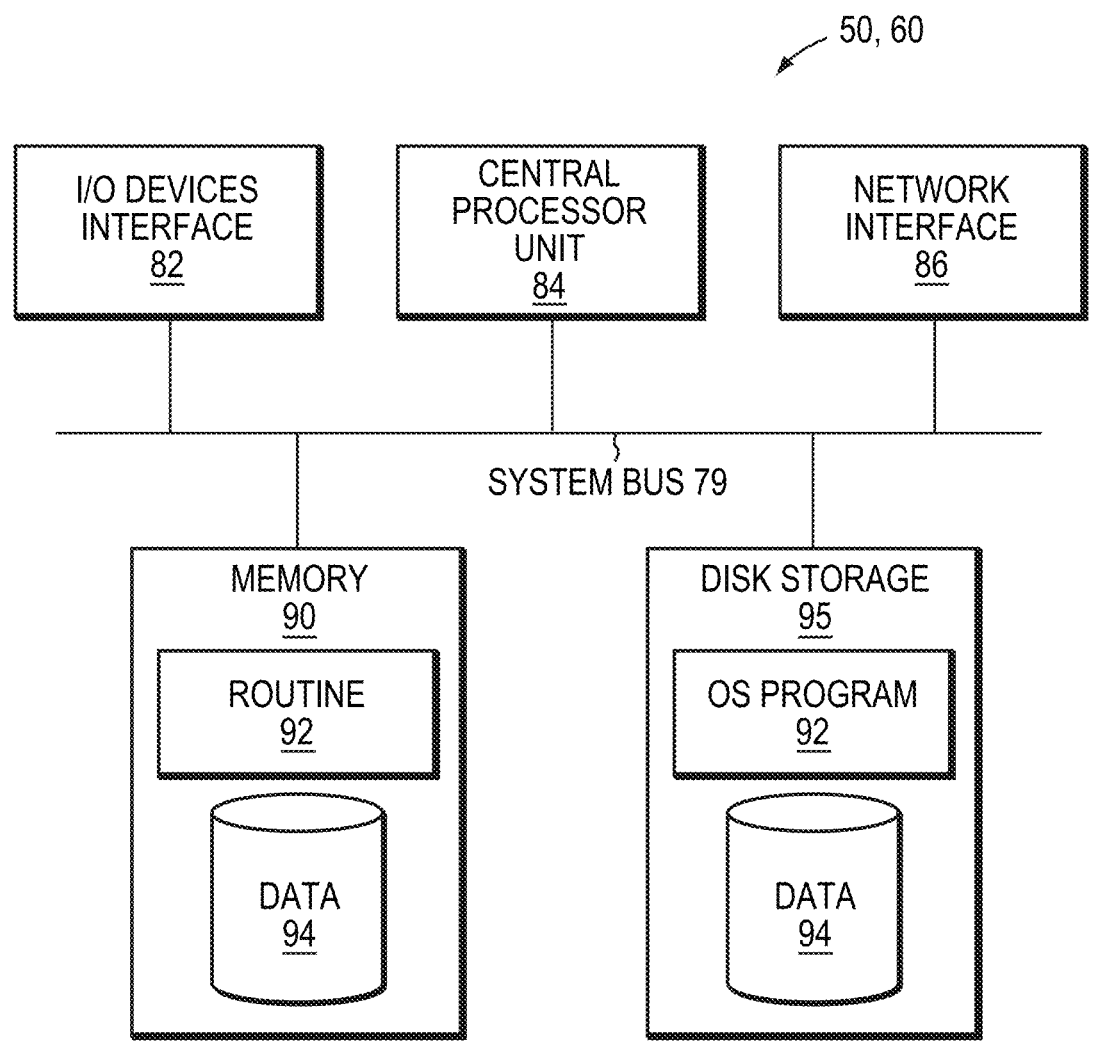
FIG. 6 is a block diagram of an example computer node in the computer network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 (such as User Interface 401 of the network architecture 400 of FIG. 4A) for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., failure detection and prediction model building and deploying in the processes of FIGS. 1A-1E, user interface implementation, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

The teachings of all patents, published applications and references cited herein are incorporated by reference in their entirety.

It should be understood that in other embodiments the present invention may be used in a wide variety of other types of equipment, or technological processes in the useful arts.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implement method for building and deploying a model predicting failure in an industrial plant or equipment process, the method comprising:
    generating a dataset by loading a set of process variables of a subject industrial plant or equipment process, each process variable comprising measurements related to at least one component of the subject industrial process;
    cleansing the generated dataset by identifying and removing measurements that are invalid in quality for modeling a failure in the subject industrial process;
    enriching the cleansed dataset by deriving one or more feature variables and corresponding values based on the measurements of the set of process variables, the enriching adding the values of the one or more derived feature variables to the cleansed dataset;
    identifying groups of highly correlated inputs by performing cross-correlation analysis on the cleansed and enriched dataset, each identified group of highly correlated inputs includes one or more of: measurements of a subset of the process variables and values of derived feature variables in the cleansed and enriched dataset;
    performing feature selection using: (a) one representative input from each identified group of highly correlated inputs, and (b) measurements of process variables not in the identified groups of highly correlated inputs, the results from the performed feature selection being output to a sub-dataset;
    building and training a failure model using the sub-dataset; and
    executing the built and trained failure model to monitor the real-time operations of the subject industrial process, wherein, based on the monitoring, predicting failures in the real-time operations.

2. The method of claim 1, wherein the measurements of each process variable are loaded in a time-series format from at least one of a plant historian data, plant asset database, plant management system, formatted spreadsheet, formatted text file, and formatted binary file.

3. The method of claim 1, wherein the measurements that are invalid in quality include at least one of: missing values, frozen signals, outlier values, values out of process in high and low limits, and extremely high noisy values.

4. The method of claim 3, where the cleansing further comprising repairing the invalid in quality measurements by at least one of: filing in missing values with interpolation, applying none-phase-shift filters to de-trend drifting and filter noisy values, replacing values with model produced values, down-sampling values with snapshots or calculated averages, and up-sampling values with interpolated values.

5. The method of claim 1, wherein deriving the one or more feature variables and corresponding values by at least one of: an engineering equation, engineering domain knowledge, a nonlinear transform, a logarithm transform, quadratic or polynomial transform, a statistical measurement over time for a time-series dataset, a calculation of a moving average value (MVA), estimates of rate of change, a calculation of standard deviation over time (STD), a calculation of moving standard deviation (MVSTD), and a calculation of moving changing rate.

6. The method of claim 5, wherein engineering domain knowledge includes at least one of: computation of a compression efficiency of a compressor, computation of a flooding factor of a distillation column, computation of internal refluxes flow, and a user defined key performance indicator (KPI) for the subject industrial process.

7. The method of claim 1, wherein identifying groups of highly correlated inputs comprises:
    (i) applying a dynamic cross-correlation function to:
        calculate cross-correlation coefficient values between each pair of inputs of the cleansed and enriched dataset over a specified correlation time window, the input variables include both measurements of the process variables and values of the derived feature variables;
        generate a maximum cross-correlation coefficient value for each pair of inputs over the specified correlation time window by searching maximum values over a trend curve of the respective cross-correlation coefficient values for the pair;
    (ii) normalize the calculated maximum coefficient value for each pair to a score;
    (iii) compare the normalized score of each pair to a defined correlation threshold;
    (iv) if the normalized score of a pair meets the defined correlation threshold, place the pair into a group of highly correlated inputs; and
    (v) if any one input of a pair is already identified as highly correlated with one or more other inputs in a different group of highly correlated inputs, add both inputs of said pair into the different group.

8. The method of claim 1, wherein feature selection includes primary feature selection that comprises:
    (i) for each input in the cleansed and enriched dataset, the input being a candidate feature of the feature selection:
        building a linear model using a step-wise linear regression approach;
        evaluating the prediction quality for each built linear model by calculating a respective prediction score over occurrences of the candidate feature, wherein the prediction score is calculated as a $R^2$ value of the candidate feature;
    (ii) adding the candidate feature with the highest prediction score to the sub-dataset, wherein other candidate features in the same group of highly correlated inputs are disqualified from further consideration to be added to the sub-dataset; and
    (iii) if the highest prediction score meets a defined threshold value, repeating said steps (i)-(iii).

9. The method of claim 8, wherein feature selection further includes secondary feature selection that comprises:
    (i) for each candidate feature in the sub-dataset:
        building a linear model using a step-wise linear regression approach,
        using the sub-dataset partitioned over time intervals that failures in the subject industrial process occur, and
        evaluating the prediction quality for each built linear model by calculating a respective prediction score over occurrences of the candidate feature, wherein the prediction score is calculated based on the number of true positives, false positives, alert times, and prediction errors for the candidate feature;

(ii) maintaining the candidate feature with the highest prediction score in the sub-dataset;
(iii) if the highest prediction score meets a defined threshold value, repeating said steps (i)-(iii);
(iv) for each candidate feature remaining in the sub-dataset:
building a PLS model using a step-wise linear regression approach, and evaluating the prediction quality for each built PLS model by calculating a respective prediction score over occurrences of the candidate feature, wherein the prediction score is calculated based on the number of true positives, false positives, alert times, and prediction errors for the candidate feature;
(v) maintaining the candidate feature with the highest prediction score in the sub-dataset, if the improvement of the linear model measured by increment of prediction scores meets a defined threshold value;
(vi) if all time interval combination of the reduced sub-dataset not evaluated or not reach a defined time limit, repeating said steps (iv)-(vi); and
(vii) outputting the PLS model having the highest prediction score for predicting failures in the subject industrial process.

10. The method of claim 1, executing the built and trained failure model to monitor the real-time operations of the subject industrial process, further comprising executing a PLS model in parallel with a deep-learning neural network (DLNN) failure model built to monitor the real-time operations for changes in correlation structures based on Hoteling statistics $T^2$ and Q statistics Square Projection Error (SPE).

11. The method of claim 1, wherein further reducing the sub-dataset by applying a Projection-to-Latent-Structure (PLS) model, including:
transforming remaining inputs of the sub-dataset into a projection latent structure by projecting the remaining inputs onto a lower-dimensional subspace with PLS algorithms;
based on the projection, determining contribution coefficients indicating statistical contribution of each remaining input to a defined failure indicator in term of magnitudes and directions, the defined failure indicator synchronized to measurements associated with one or more failures in the subject industrial process;
providing the remaining input in ranked order of the determined contribution coefficients; and
based on the ranking, removing from the generated dataset one or more inputs having contribution coefficients showing insignificant statistical contribution or with high uncertainty in statistical confidence.

12. A computer system for building and deploying a model predicting failure in an industrial process or equipment, the system comprising:
a processor; and
a memory with computer code instructions stored thereon, the memory operatively coupled to the processor such that, when executed by the processor, the computer code instructions cause the computer system to implement:
(a) a data importer module configured to:
generate a dataset by loading a set of process variables of a subject industrial plant or equipment process, each process variable comprising measurements related to at least one component of the subject industrial process;
(b) an input data preparation module configured to:
cleanse the generated dataset by identifying and removing measurements that are invalid in quality for modeling a failure in the subject industrial process;
enrich the cleansed dataset by deriving one or more feature variables and corresponding values based on the measurements of the set of process variables, the enriching adding the values of the one or more derived feature variables to the cleansed dataset;
identify groups of highly correlated inputs by performing cross-correlation analysis on the cleansed and enriched dataset, each identified group of highly correlated inputs includes one or more of: measurements of a subset of the process variables and values of derived feature variables in the cleansed and enriched dataset; and
perform feature selection using: (a) one representative input from each identified group of highly correlated inputs, and (b) measurements of process variables not in the identified groups of highly correlated inputs, the results from the performed feature selection being output to a sub-dataset;
(c) a model training module configured to build and train a failure model using the reduced dataset; and
(d) a model execution module configured to execute the built and trained failure model to monitor the real-time operations of the subject industrial process, wherein, based on the monitoring, the built and trained failure model predicts failures in the real-time operations.

13. The system of claim 12, wherein the data importer module is further configured to load measurements of each process variables in a time-series format from at least one of a plant historian data, plant asset database, plant management system, formatted spreadsheet, formatted text file, and formatted binary file.

14. The system of claim 12, wherein the measurements that are invalid in quality include at least one of: missing values, frozen signals, outlier values, values out of process in hi and low limits, and extremely high noisy values.

15. The system of claim 12, wherein the input data preparation module is further configured to repair the invalid in quality measurements by at least one of: filing in missing values with interpolation, applying none-phase-shift filters to de-trend drifting and filter noisy values, replacing values with model produced values, up-sampling values with snapshots or calculated averages, and down-sampling values with interpolated values.

16. The system of claim 12, wherein the input data preparation module is further configured to derive the one or more feature variables and corresponding values by at least one of: an engineering equation, engineering domain knowledge, a nonlinear transform, a logarithm transform, quadratic or polynomial transform, a statistical measurement over time for a time-series dataset, a calculation of a moving average value (MVA), estimates of rate of change, a calculation of standard deviation over time (STD), a calculation of moving standard deviation (MVSTD), and a calculation of moving changing rate.

17. The system of claim 12, further comprising wherein engineering domain knowledge includes at least one of: computation of a compression efficiency of a compressor, computation of a flooding factor of a distillation column, computation of internal refluxes flow, and a user defined key performance indicator (KPI) for the subject industrial process.

18. The system of claim 12, wherein the input data preparation module identifies groups of highly correlated inputs by:

(i) applying a dynamic cross-correlation function to:
    calculate cross-correlation coefficient values between each pair of inputs of the cleansed and enriched dataset over a specified correlation time window, the input variables include both measurements of the process variables and values of the derived feature variables;
    generate a maximum cross-correlation coefficient value for each pair of inputs over the specified correlation time window by searching maximum values over a trend curve of the respective cross-correlation coefficient values for the pair;
(ii) normalize the calculated maximum coefficient value for each pair to a score;
(iii) compare the normalized score of each pair to a defined correlation threshold;
(iv) if the normalized score of a pair meets the define correlation threshold, place the pair into a group of highly correlated inputs; and
(v) if any one input of a pair is already identified as highly correlated with one or more other inputs in a different group of highly correlated inputs, add both inputs of said pair into the different group.

19. The system of claim 12, wherein feature selection includes primary feature selection that comprises:
(i) for each input in the cleansed and enriched dataset, the input being a candidate feature of the feature selection:
    building a linear model using a step-wise linear regression approach;
    evaluating the prediction quality for each built linear model by calculating a respective prediction score over occurrences of the candidate feature, wherein the prediction score is calculated as a $R^2$ value of the candidate feature;
(ii) adding the candidate feature with the highest prediction score to the sub-dataset, wherein other candidate features in the same group of highly correlated inputs are disqualified from further consideration to be added to the sub-dataset; and
(iii) if the highest prediction score meets a defined threshold value, repeating said steps (i)-(iii).

20. The system of claim 19, wherein feature selection further includes secondary feature selection that comprises:
(i) for each candidate feature in the sub-dataset:
    building a linear model using a step-wise linear regression approach,
    using the sub-dataset partitioned over time intervals that failures in the subject industrial process occur, and
    evaluating the prediction quality for each built linear model by calculating a respective prediction score over occurrences of the candidate feature, wherein the prediction score is calculated based on the number of true positives, false positives, alert times, and prediction errors for the candidate feature;
(ii) maintaining the candidate feature with the highest prediction score in the sub-dataset, if improvement of the linear model measured by increment of prediction scores meets a defined threshold value;
(iii) if the highest prediction score meets a defined threshold value, repeating said steps (i)-(iii);
(iv) for each candidate feature remaining in the sub-dataset:
    building a PLS model using a step-wise linear regression approach, and
    evaluating the prediction quality for each built PLS model by calculating a respective prediction score over occurrences of the candidate feature, wherein the prediction score is calculated based on the number of true positives, false positives, alert times, and prediction errors for the candidate feature;
(v) maintaining the candidate feature with the highest prediction score in the sub-dataset, if improvement of the PLS model measured by increment of prediction scores meets a defined threshold value;
(vi) if all time interval combination of the reduced sub-dataset not evaluated or not reach a defined time limit, repeating said steps (iv)-(vi); and
(vii) outputting the PLS model having the highest prediction score for predicting failures in the subject industrial process.

21. The system of claim 12, wherein the model execution module is further configured to execute a PLS model in parallel with a deep-learning neural network (DLNN) failure model to monitor the real-time operations for changes in correlation structures based on Hoteling statistics $T^2$ and Q statistics Square Projection Error (SPE).

22. The system of claim 12, wherein the input data preparation module is further configured to further reducing the sub-dataset by applying a Projection-to-Latent-Structure (PLS) model, including:
    transforming remaining process variables of the reduced dataset into a projection latent structure by projecting the remaining process variables onto a lower-dimensional subspace with PLS techniques;
    based on the projection, determining contribution coefficients indicating statistical contribution of each remaining process variables to the failure indicator in term of magnitudes and directions;
    providing the remaining process variables in ranked order of the determined contribution coefficients; and
    based on the ranking, removing from the generated dataset one or more process variables having contribution coefficients showing insignificant statistical contribution or with high uncertainty in statistical confidence.

23. The system of claim 12, wherein the system is implemented in a cloud computing environment, comprising:
    a cloud computing engine that executes the data importer, the input data preparation module, the model training module, and the model execution module; and
    the cloud computing engine configured to:
        receive from a client, a building, training, or testing request for a failure model;
        attempt to authenticate and authorize the received request by accessing data stored in memory coupled to the cloud computing engine; and
        if the received request is authenticated and authorized, execute corresponding tasks to build, train, or test the failure model.

24. A computer program product comprising:
    generate a dataset by loading a set of process variables of a subject industrial plant or equipment process, each process variable comprising measurements related to at least one component of the subject industrial process;
    cleanse the generated dataset by identifying and removing measurements that are invalid in quality for modeling a failure in the subject industrial process;
    enrich the cleansed dataset by deriving one or more feature variables and corresponding values based on the measurements of the set of process variables, the enriching adding the values of the one or more derived feature variables to the cleansed dataset;

identify groups of highly correlated inputs by performing cross-correlation analysis on the cleansed and enriched dataset, each identified group of highly correlated inputs includes one or more of: measurements of a subset of the process variables and values of derived feature variables in the cleansed and enriched dataset;

perform feature selection using: (a) one representative input from each identified group of highly correlated inputs, and (b) measurements of process variables not in the identified groups of highly correlated inputs, the results from the performed feature selection being output to a sub-dataset;

build and train a failure model using the sub-dataset; and execute the built and trained failure model to monitor the real-time operations of the subject industrial process, wherein, based on the monitoring, predicting failures in the real-time operations.

* * * * *